(12) United States Patent
Sun et al.

(10) Patent No.: US 10,470,219 B2
(45) Date of Patent: Nov. 5, 2019

(54) CONTENTION-BASED ORTHOGONAL FREQUENCY DIVISION MULTIPLE ACCESS (OFDMA) COMMUNICATION

(71) Applicant: Marvell World Trade Ltd., St. Michael (BB)

(72) Inventors: Yakun Sun, Sunnyvale, CA (US); Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 48 days.

(21) Appl. No.: 15/337,749

(22) Filed: Oct. 28, 2016

(65) Prior Publication Data

US 2017/0048890 A1    Feb. 16, 2017

Related U.S. Application Data

(63) Continuation of application No. 15/096,098, filed on Apr. 11, 2016.
(Continued)

(51) Int. Cl.
| | | |
|---|---|---|
| H04W 72/04 | (2009.01) | |
| H04W 74/08 | (2009.01) | |
| H04L 5/00 | (2006.01) | |
| H04W 8/24 | (2009.01) | |
| H04W 52/50 | (2009.01) | |
| H04W 74/00 | (2009.01) | |

(52) U.S. Cl.
CPC ....... *H04W 74/0833* (2013.01); *H04L 5/0007* (2013.01); *H04L 5/0044* (2013.01); *H04W 8/24* (2013.01); *H04W 52/50* (2013.01); *H04W 72/0413* (2013.01); *H04W 74/006* (2013.01); *H04W 74/08* (2013.01)

(58) Field of Classification Search
None
See application file for complete search history.

(56) References Cited

U.S. PATENT DOCUMENTS 8,886,755 B1    11/2014 Liu et al.
2013/0229996 A1    9/2013 Wang et al.
(Continued)

FOREIGN PATENT DOCUMENTS

WO    WO-2016/069399 A1    5/2016

OTHER PUBLICATIONS

International Preliminary Report on Patentability in International Patent Application No. PCT/US2016/026962, dated Oct. 19, 2017 (7 pages).
(Continued)

*Primary Examiner* — Edan Orgad
*Assistant Examiner* — Emmanuel K Maglo

(57) ABSTRACT

A communication device receives a trigger frame that is configured to: trigger a contention-based uplink orthogonal frequency multiple access (OFDMA) transmission by multiple communication devices, and indicate a predetermined length of the contention-based uplink OFDMA transmission, wherein the predetermined length corresponds to contention-based uplink OFDMA transmissions. Responsive to receiving the trigger frame, the communication device generates a data unit having the predetermined length, and responsive to receiving the trigger frame, transmits the data unit as part of a contention-based uplink OFDMA transmission.

16 Claims, 9 Drawing Sheets

Related U.S. Application Data

(60) Provisional application No. 62/145,407, filed on Apr. 9, 2015.

(56) References Cited

U.S. PATENT DOCUMENTS

| | | | | |
|---|---|---|---|---|
| 2015/0063190 | A1* | 3/2015 | Merlin | H04L 5/0037 370/312 |
| 2015/0063258 | A1* | 3/2015 | Merlin | H04L 47/12 370/329 |
| 2015/0131517 | A1 | 5/2015 | Chu et al. | |
| 2015/0201434 | A1* | 7/2015 | Fang | H04W 74/0816 370/335 |
| 2016/0087775 | A1* | 3/2016 | Hedayat | H04L 1/12 370/329 |
| 2016/0100396 | A1* | 4/2016 | Seok | H04L 5/003 370/329 |
| 2016/0164652 | A1* | 6/2016 | Huang | H04W 74/0816 370/329 |
| 2016/0165574 | A1 | 6/2016 | Chu et al. | |
| 2016/0165589 | A1 | 6/2016 | Chu et al. | |
| 2016/0165598 | A1* | 6/2016 | Azizi | H04W 72/0413 370/336 |
| 2016/0183243 | A1* | 6/2016 | Park | H04W 72/0413 370/329 |
| 2016/0211961 | A1* | 7/2016 | Azizi | H04L 5/0035 |
| 2016/0242070 | A1* | 8/2016 | Asterjadhi | H04L 5/0055 |
| 2016/0242177 | A1* | 8/2016 | Seok | H04W 72/0446 |
| 2016/0249303 | A1* | 8/2016 | Kenney | H04W 24/08 |
| 2016/0302185 | A1 | 10/2016 | Sun et al. | |
| 2016/0345362 | A1* | 11/2016 | Lee | H04W 74/0816 |
| 2016/0353434 | A1* | 12/2016 | Ghosh | H04W 72/0446 |
| 2017/0019863 | A1* | 1/2017 | Cariou | H04W 52/283 |
| 2017/0272138 | A1* | 9/2017 | Chun | H04L 29/08 |

OTHER PUBLICATIONS

IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.16™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).

Chen, "Home Network Basis: Transmission Environments and Wired/Wireless Protocols," Prentice Hall, pp. 1-26 (Jul. 2006).

Hiertz et al., "The IEEE 802.11 Universe," IEEE Communications Magazine, pp. 62-70, (Jan. 2010).

Ryu et al., "UL MU Procedure," IEEE draft 802.11-15/0365r0, 16 pages (Mar. 9, 2015).

Seok et al., "HEW PPDU Format for Supporting MIMO-OFDMA," IEEE 802.11-14/1210r0, 16 pages, (Sep. 14, 2014).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

International Search Report and Written Opinion in International Application No. PCT/US2016/026962, dated Jul. 1, 2016 (11 pages).

Communication Pursuant to Article 94(3) EPC in European Patent Application No. 16718129.6, dated May 15, 2019 (5 pages).

* cited by examiner

CONTENTION-BASED ORTHOGONAL FREQUENCY DIVISION MULTIPLE ACCESS (OFDMA) COMMUNICATION

CROSS-REFERENCES TO RELATED APPLICATIONS

This application is a continuation of U.S. patent application Ser. No. 15/096,098, filed on Apr. 11, 2016, entitled "Contention-Based Orthogonal Frequency Division Multiple Access (OFDMA) Communication," which claims the benefit of U.S. Provisional Patent Application No. 62/145,407, filed on Apr. 9, 2015, entitled "Random Access Signals for WiFi." The disclosures of both of the applications referenced above are incorporated by reference herein in their entireties.

Additionally, the present application is related to U.S. patent application Ser. No. 14/961,380, filed on Dec. 7, 2015, entitled "Trigger Frame Format for Orthogonal Frequency Division Multiple Access (OFDMA) communication," and to U.S. patent application Ser. No. 14/961,635, filed on Dec. 7, 2015, entitled "Trigger Frame Format for Orthogonal Frequency Division Multiple Access (OFDMA) communication," which are incorporated by reference herein in their entireties.

FIELD OF THE DISCLOSURE

The present disclosure relates generally to communication networks and, more particularly, to wireless local area networks that utilize orthogonal frequency division multiple access (OFDMA) technology.

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, 802.11n, and 802.11ac Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for communicating in a wireless communication network includes: generating, at a first communication device, a trigger frame to trigger a contention-based uplink orthogonal frequency multiple access (OFDMA) transmission by multiple second communication devices, wherein the trigger frame is configured to indicate a predetermined length of the contention-based uplink OFDMA transmission, and the predetermined length corresponds to contention-based uplink OFDMA transmissions; transmitting, with the first communication device, the trigger frame to the multiple second communication devices; and receiving, at the first communication device, the contention-based uplink OFDMA transmission, wherein the contention-based uplink OFDMA transmission is of the predetermined length.

In another embodiment, an apparatus comprises a network interface device associated with a first communication device. The network interface device includes one or more integrated circuits configured to: generate a trigger frame to trigger a contention-based uplink orthogonal frequency multiple access (OFDMA) transmission by multiple second communication devices, wherein the trigger frame is configured to indicate a predetermined length of the contention-based uplink OFDMA transmission, and the predetermined length corresponds to contention-based uplink OFDMA transmissions; transmit the trigger frame to the multiple second communication devices; and receive the contention-based uplink OFDMA transmission, wherein the contention-based uplink OFDMA transmission is of the predetermined length.

In yet another embodiment, a method for communicating in a wireless communication network includes: receiving, at a communication device, a trigger frame configured to: trigger a contention-based uplink orthogonal frequency multiple access (OFDMA) transmission by multiple communication devices, and indicate a predetermined length of the contention-based uplink OFDMA transmission, wherein the predetermined length corresponds to contention-based uplink OFDMA transmissions. The method also includes: responsive to receiving the trigger frame, generating, at the communication device, a data unit having the predetermined length; and responsive to receiving the trigger frame, transmitting, with the communication device, the data unit as part of a contention-based uplink OFDMA transmission.

In still another embodiment, an apparatus comprises a network interface device associated with a communication device. The network interface device includes one or more integrated circuits configured to: receive a trigger frame configured to: trigger a contention-based uplink orthogonal frequency multiple access (OFDMA) transmission by multiple communication devices, and indicate a predetermined length of the contention-based uplink OFDMA transmission, wherein the predetermined length corresponds to contention-based uplink OFDMA transmissions. The one or more integrated circuits are also configured to: generate a data unit having the predetermined length in response to receiving the trigger frame; and transmit the data unit as part of a contention-based uplink OFDMA transmission in response to receiving the trigger frame.

In yet another embodiment, a method for communicating in a wireless communication network includes: receiving, at a communication device, a trigger frame configured to: trigger a contention-based uplink orthogonal frequency multiple access (OFDMA) transmission by multiple communication devices; and responsive to receiving the trigger frame, generating, at the communication device, a data unit, including generating a sequence of values that indicates a contention-based transmission. Generating the sequence of values includes using one or more parameters. The method also includes, responsive to receiving the trigger frame, transmitting, with the communication device, the data unit as part of a contention-based uplink OFDMA transmission.

In still another embodiment, an apparatus comprises a network interface device associated with a communication device. The network interface device includes one or more integrated circuits configured to: receive a trigger frame configured to trigger a contention-based uplink orthogonal frequency multiple access (OFDMA) transmission by multiple communication devices. The one or more integrated circuits are also configured to: generate a data unit having the predetermined length in response to receiving the trigger frame, including generating a sequence of values that indicates a contention-based transmission. Generating the sequence of values includes using one or more parameters. The one or more integrated circuits are also configured to: transmit the data unit as part of a contention-based uplink OFDMA transmission in response to receiving the trigger frame.

In yet another embodiment, a method for communicating in a wireless communication network includes: generating, at a first communication device, a trigger frame to trigger a contention-based uplink orthogonal frequency multiple access (OFDMA) transmission by multiple second communication devices; and transmitting the trigger frame to the multiple second communication devices. The method also includes receiving, at the first communication device, the contention-based uplink OFDMA transmission, wherein the contention-based uplink OFDMA transmission includes a contention-based transmission from one of the second communication devices, the contention-based transmission including a sequence of values that indicates a contention-based transmission. The method further includes processing, at the first communication device, the sequence of values to determine at least one of i) that the contention-based transmission was transmitted by the one second communication device, and ii) a message being conveyed by the one second communication device.

In another embodiment, an apparatus comprises a network interface device associated with a first communication device. The network interface device includes one or more integrated circuits configured to: generate a trigger frame to trigger a contention-based uplink orthogonal frequency multiple access (OFDMA) transmission by multiple second communication devices; and transmit the trigger frame to the multiple second communication devices. The one or more integrated circuits are also configured to receive the contention-based uplink OFDMA transmission, wherein the contention-based uplink OFDMA transmission includes a contention-based transmission from one of the second communication devices, the contention-based transmission including a sequence of values that indicates a contention-based transmission. The one or more integrated circuits are also configured to process the sequence of values to determine at least one of i) that the contention-based transmission was transmitted by the one second communication device, and ii) a message being conveyed by the one second communication device.

DETAILED DESCRIPTION

In embodiments described below, a first communication device, such as an access point (AP) of a wireless local area network (WLAN), transmits a trigger frame to multiple second communication devices, such as client stations of the WLAN, to prompt second communication devices to transmit as part of a contention-based uplink orthogonal frequency multiple access (OFDMA) transmission. In some embodiments, the trigger frame specifies a length of the contention-based uplink OFDMA transmission. In other embodiments, the contention-based uplink OFDMA transmission has a predetermined length and/or the trigger frame indicates a predetermined length from a set of predetermined lengths. In some embodiments, the contention-based uplink OFDMA transmission utilizes predetermined physical layer (PHY) parameters such as one or more of i) a predetermined number of spatial streams, ii) a predetermined type of error correction coding, iii) a predetermined modulation scheme, and iv) a predetermined coding scheme.

In some embodiments, second communication devices participating in the contention-based uplink OFDMA transmission transmit respective sequences, referred to herein as random access sequences. In an embodiment, a second communication device chooses a random access sequence to indicate information to be conveyed to the first communication device, and the first communication device determines the information based on the particular random access sequence chosen by the second communication device.

The first communication device, e.g., an AP, and the second communication devices, e.g., client stations, are configured to operate according to at least a first communication protocol. The first communication protocol is sometimes referred herein as "high efficiency WiFi," "HEW" communication protocol, "HE" communication protocol, or IEEE 802.11ax communication protocol. In an embodiment, the first communication protocol supports orthogonal frequency division (OFDM) communication in both downlink direction from the AP to one or more client stations and uplink direction from one or more client stations to the AP. In an embodiment, the first communication protocol also supports a multi-user (MU) mode in which the AP receives independent data units simultaneously transmitted by multiple client stations, in some embodiments. In some embodiments, multi-user transmissions by multiple client stations are performed using orthogonal frequency division multiple access (OFDMA) transmission in which respective frequency sub-channels of a communication channel are used for simultaneous transmission to, or by, respective ones of multiple client stations, in various embodiments.

Figure 1:
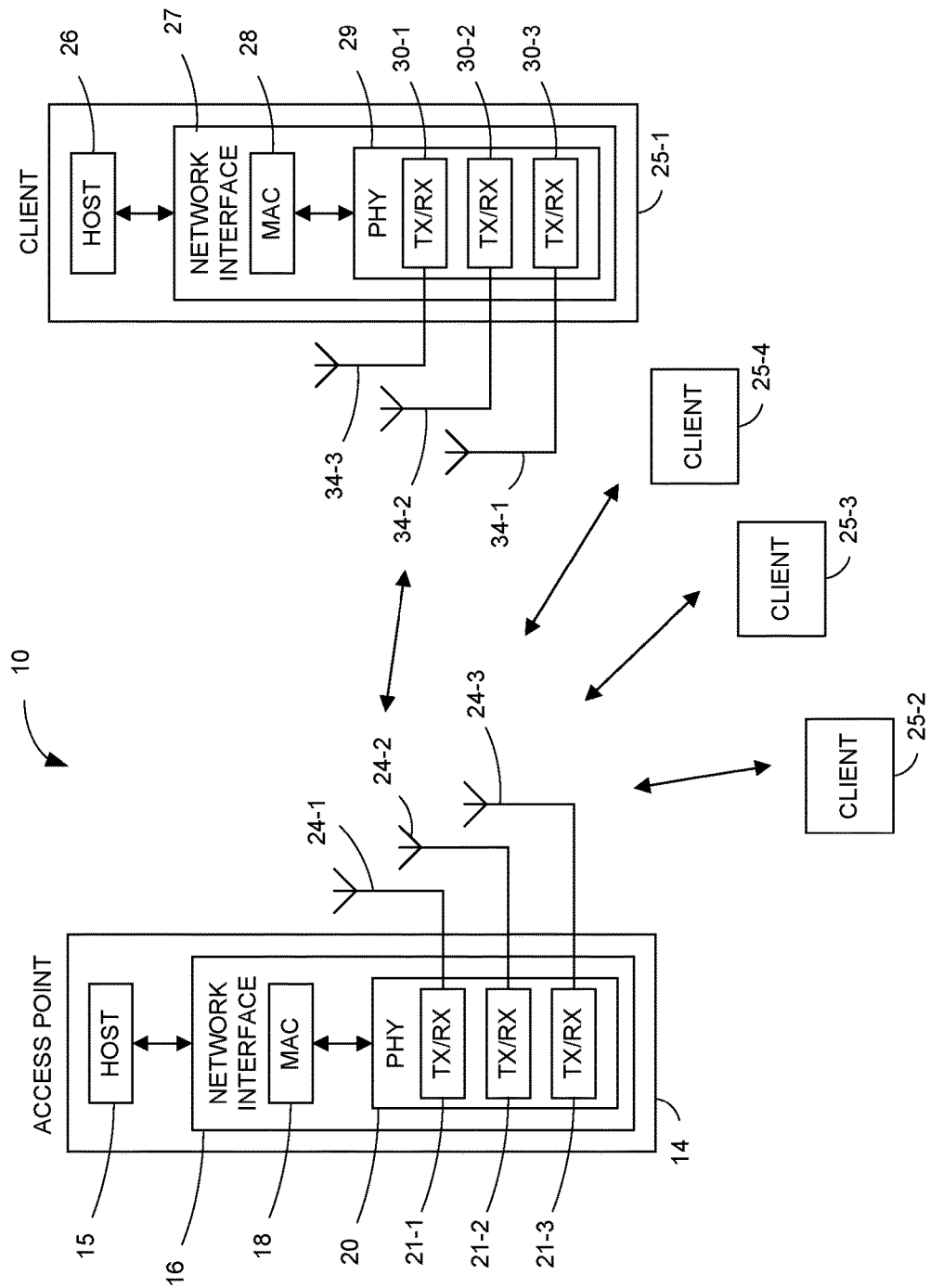
FIG. 1 is a block diagram of an example wireless local area network (WLAN), according to an embodiment.

FIG. 1 is a block diagram of an example wireless local area network (WLAN) 10, according to an embodiment. The WLAN 10 supports uplink (UL) OFDMA communication from a plurality of client stations to an AP 14. The WLAN 10 includes the AP 14, and the AP 14, in turn, includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In an embodiment, the network interface device 16 includes one or more integrated circuit (IC) devices. For example, at least some of the functionality of the MAC processing unit 18 and at least some of the functionality of the PHY processing unit 20 are implemented on a single IC device, according to an embodiment. As another example, at least some of the functionality of the MAC processing unit 18 is implemented on a first IC device, and at least some of the functionality of the PHY processing unit 20 is implemented on a second IC device, according to an embodiment.

In some embodiments, the MAC processing unit 18 is configured to perform MAC layer functions of the first communication protocol, such as generating MAC protocol data units (MPDUs) that are to be transmitted and providing the MPDUs to the PHY processing unit 20 for transmission. In some embodiments, the MAC processing unit 18 is configured to receive MPDUs from the PHY processing unit 20 and process the MPDUs, which correspond to communications received from client stations 25.

In some embodiments, the PHY processing unit 20 is configured to receive MPDUs from the MAC processing unit 18, and encapsulate such MPDUs in PHY protocol data units (PPDUs) for transmission, and to transmit the PPDUs to client stations 25. In some embodiments, the PHY processing unit 20 is configured to receive PPDUs corresponding to communications received from client stations 25, extract MPDUs from such PPDUs, and provide the MPDUs to the MAC processing unit 18.

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to a legacy communication protocol (referred to herein as a "legacy client station").

The client station 25-1 includes a host processor 26 coupled to a network interface device 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. A client station 25-1 includes a host processor 26 coupled to a network interface 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments. In an embodiment, the network interface device 27 includes one or more IC devices. For example, at least some of the functionality of the MAC processing unit 28 and at least some of the functionality of the PHY processing unit 29 are implemented on a single IC device, according to an embodiment. As another example, at least some of the functionality of the MAC processing unit 28 is implemented on a first IC device, and at least some of the functionality of the PHY processing unit 29 is implemented on a second IC device, according to an embodiment.

In some embodiments, the MAC processing unit 28 is configured to perform MAC layer functions of the first communication protocol, such as generating MPDUs that are to be transmitted and providing the MPDUs to the PHY processing unit 29 for transmission. In some embodiments, the MAC processing unit 28 is configured to receive MPDUs from the PHY processing unit 20 and process the MPDUs, which correspond to communications received from the AP 14 or other client stations 25.

In some embodiments, the PHY processing unit 29 is configured to receive MPDUs from the MAC processing unit 28, and encapsulate such MPDUs in PPDUs for transmission, and to transmit the PPDUs to the AP 14 or other client stations 25. In some embodiments, the PHY processing unit 29 is configured to receive PPDUs corresponding to communications received from the AP 14 or other client stations 25, extract MPDUs from such PPDUs, and provide the MPDUs to the MAC processing unit 28.

In an embodiment, one or both of the client stations 25-2, 25-3, and 25-4, has a structure the same as or similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processing unit 18 and/or the PHY processing unit 20 of the AP 14 are configured to generate data units conforming to the first communication protocol and having formats described herein. The transceiver(s) 21 is/are configured to transmit the generated data units via the antenna(s) 24. Similarly, the transceiver(s) 21 is/are configured to receive the data units via the antenna(s) 24. The MAC processing unit 18 and/or PHY processing unit 20 of the AP 14 are configured to process received data units conforming to the first communication protocol and having formats described herein and to determine that such data units conform to the first communication protocol, according to various embodiments.

In various embodiments, the MAC processing unit 28 and/or the PHY processing unit 29 of the client device 25-1 are configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The MAC processing unit 28 and/or the PHY processing unit 29 of the client device 25-1 are configured to process received data units conforming to the first communication protocol and having formats described hereinafter and to determine that such data units conform to the first communication protocol, according to various embodiments.

When operating in an UL OFDMA mode, the AP 14 receives data units simultaneously transmitted by multiple client stations 25, in an embodiment. For example, in the UL OFDMA mode, a data unit transmitted by multiple stations 25 includes multiple data streams simultaneously transmitted by the multiple stations 25 using respective sets of OFDM tones corresponding to respective frequency sub-channels allocated for simultaneous transmission to the AP 14.

Figure 2:
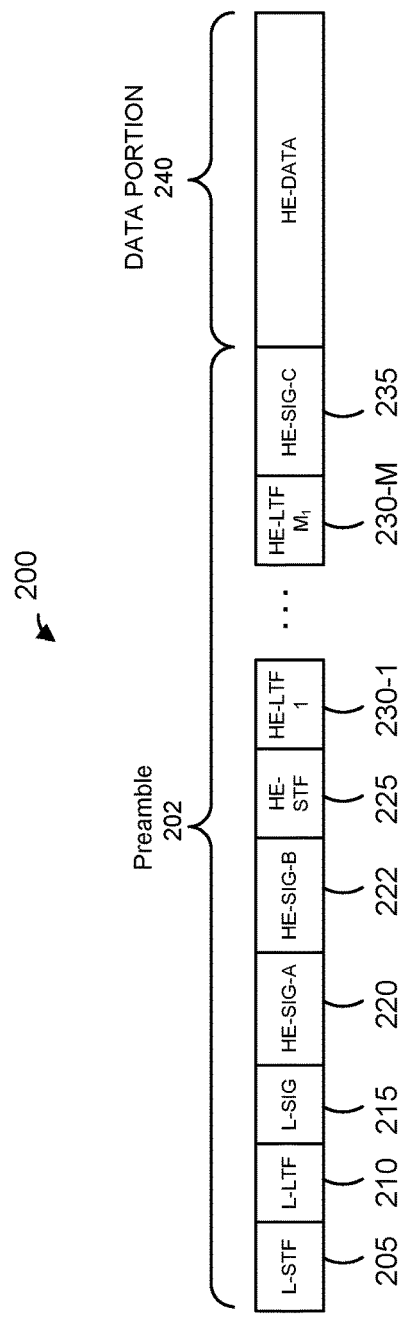
FIG. 2 is a diagram of an example physical layer (PHY) data unit, according an embodiment.

FIG. 2 is a diagram of a physical layer (PHY) data unit 200 that the AP 14 is configured to transmit to one or more client stations 25 (e.g., the client station 25-1), according to an embodiment. In an embodiment, one or more client stations 25 (e.g., the client station 25-1) are also configured to transmit data units the same as or similar to the data unit 200 to the AP 14. The data unit 200, in one embodiment, conforms to the HE communication protocol and occupies a 20 MHz bandwidth. Data units similar to the data unit 200 occupy other suitable bandwidths such as 40 MHz, 80 MHz, 160 MHz, 320 MHz, 640 MHz, for example, or other suitable bandwidths, in other embodiments. The data unit 200 is suitable for "mixed mode" situations, i.e. when the WLAN 10 includes a client station that conforms to a legacy communication protocol, but not the first communication protocol. The data unit 200 is utilized in other situations as well, in some embodiments.

In various embodiments and/or scenarios, the data unit 200 is a downlink (DL) orthogonal frequency division multiple access (OFDMA) unit in which independent data streams are transmitted to multiple client stations 25 using respective sets of OFDM tones and, in some cases respective spatial streams, allocated to the client stations 25. Similarly, in various embodiments and/or scenarios, the data unit 200 is an uplink (UL) OFDMA data unit transmitted by a particular client station 25 as part of an OFDMA uplink transmission by multiple client stations 25, wherein each of the multiple client stations 25 transmits data using a set of OFDM tones and, in some cases, respective one or more spatial streams, allocated to the client station 25. For example, in an embodiment, available OFDM tones (e.g., OFDM tones that are not used as DC tone and/or guard tones) are partitioned into multiple resource units (RUs), and each of the multiple RUs is allocated to one or more client stations 25 for transmission of data to, or by, the one or more of the client stations 25. In an embodiment, allocation of OFDM tones is performed using basic resource unit blocks defined by the first communication protocol. A basic resource unit block is sometimes referred to herein as simply a "basic resource unit." For example, a basic resource unit includes K OFDM tones, wherein K is an integer greater than zero, each allocated resource unit is comprised of one or more K-OFDM tone basic resource units. As just an example, K=26, in an embodiment. Accordingly, a basic resource unit includes 26 OFDM tones, in this embodiment. A resource unit allocated to a client station 25, or allocated to a multi-user group of client stations 25, includes a number of OFDM tones that is an integer multiple of 26 OFDM tones, such as 26 OFDM tones, 52 OFDM tones, 78 OFDM tones, etc., in this embodiment. In another embodiment, K is any suitable integer other than 26, and a basic resource unit includes a corresponding number of OFDM tones other than 26.

The data unit 200 includes a preamble including a legacy short training field (L-STF) 205, a legacy long training field (L-LTF) 210, a legacy signal field (L-SIG) 215, a first HE signal field (HE-SIG-A) 220, a second HE signal field (HE-SIG-B) 222, an HE short training field (HE-STF) 225, M HE long training fields (HE-LTFs) 230, where M is an integer, and a third HE signal field (HE-SIG-C) 235. In some embodiments and/or scenarios, the data unit 200 also includes a data portion 240. In some embodiments and/or scenarios, the data unit 200 omits the data portion 240.

In some embodiments and/or scenarios, the preamble 202 omits one or more of the fields 205-235. For example, the preamble 202 omits one or more of the HE-SIG-A 220, the HE-SIG-B 222 and the HE-SIG-C 235, in an embodiment. In some embodiments, the preamble 202 includes additional fields not illustrated in FIG. 2.

Each of the L-STF 205, the L-LTF 210, the L-SIG 215, the HE-SIG-A 220, the HE-SIG-B 222, the HE-STF 225, the M HE-LTFs 230, and the HE-SIG-C 235 comprises one or more OFDM symbols. The HE-SIG-A 220, the HE-SIG-B 222 and the HE-SIG-C 235 are each individually encoded to generate the respective number of OFDM symbols, in an embodiment. As merely an example, in an embodiment, the HE-SIG-A 220 comprises two OFDM symbols, and each of the HE-SIG-B 222 and the HE-SIG-C 235 comprises one OFDM symbol. As merely another example, in another embodiment, the HE-SIG-A 220 comprises one OFDM symbol, the HE-SIG-B comprises two OFDM symbols, and the HE-SIG-C comprises one OFDM symbol. As yet another example, in an embodiment, the HE-SIG-A 220 comprises two OFDM symbols, the HE-SIG-B 222 comprises a variable number of OFDM symbols, and the HE-SIG-C 235 is omitted. In an embodiment in which the HE-SIG-B 222 comprises a variable number of OFDM symbols, the particular number of HE-SIG-B 222 OFDM symbols in the data unit 200 is indicated in the HE-SIG-A 220.

In the embodiment of FIG. 2, the data unit 200 includes one of each of the L-STF 205, the L-LTF 210, the L-SIG 215, and the HE-SIG-A 220. In other embodiments in which a data unit similar to the data unit 200 occupies a cumulative bandwidth other than 20 MHz, each of the L-STF 205, the L-LTF 210, the L-SIG 215 and HE-SIG-A 220 is repeated over a corresponding number of 20 MHz sub-bands of the whole bandwidth of the data unit, in an embodiment. For example, in an embodiment, the data unit occupies an 80 MHz bandwidth and, accordingly, includes four of each of the L-STF 205, the L-LTF 210, the L-SIG 215, and the HE-SIG-A 220. In an embodiment in which a data unit similar to the data unit 200 occupies a cumulative bandwidth other than 20 MHz, the HE-SIG-B is repeated over a corresponding number of 20 MHz sub-bands of the whole bandwidth of the data unit. In another embodiment in which a data unit similar to the data unit 200 occupies a cumulative bandwidth other than 20 MHz, the HE-SIG-B 222 includes different channel-specific portions corresponding to different 20 MHz sub-bands of the whole bandwidth of the data unit, and the different channel specific portions are transmitted in parallel in the corresponding 20 MHz sub-bands of the whole bandwidth of the data unit 200.

In some embodiments, the modulation of different 20 MHz sub-bands signals is rotated by different angles. For example, in one embodiment, all OFDM tones within a first subband are rotated 0-degrees, all OFDM tones within a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIG-B and the HE data portion occupy the corresponding whole bandwidth of the data unit.

In an embodiment, each of the HE-SIG-A 220, the HE-SIG-B 222 and the HE-SIG-C 235 generally carries information about the format of the data unit 200, such as information needed to properly decode at least a portion of the data unit 200, in an embodiment. In an embodiment in which the data unit 200 is a multi-user data unit, HE-SIG-A 220 carries information commonly needed by multiple intended receivers of the data unit 200. In some embodiments, HE-SIG-A 220 additionally includes information for client stations 25 that are not intended receivers of the data unit 200, such as information needed for medium protection from the client stations 25 that are not receivers of the data unit 200. On the other hand, HE-SIG-B 222 and HE-SIG-C 235 carry user-specific information individually needed by each client station 25 that is an intended recipient of the data unit 200, in an embodiment. In an embodiment, HE-SIG-A 220 includes information needed to properly decode HE-SIG-B 222, and HE-SIG-B 222 includes information needed to properly decode data streams in the data portion 240 of the data unit 200. In some embodiments and/or scenarios, however, HE-SIG-A field 220 includes at least some of the information needed to decode the data portion 240, and HE-SIG-B 222 is omitted from the data unit 200 in at least some such embodiments. In at least some embodiments and scenarios in which the AP 14 is the intended recipient of the data unit 200 (i.e., when the data unit 200 is an uplink data unit), information needed to properly decode the data portion of the data unit 200 is known a priori to the intended recipient of the data unit 200 and need not be included in the preamble of the data unit 200. In some such embodiments, the HE-SIG-B 222 and HE-SIG-C 325 are both omitted from the data unit 200.

In some embodiments, specific information included in the HE-SIG-A 220 and/or in the HE-SIG-B 222 depends on the mode of transmission of the data unit 200. For example, information included in the HE-SIG-A 220 and/or information included in the HE-SIG-B 222 depends on mode of transmission of the data unit 200, in an embodiment. In an embodiment, different information is included in the HE-SIG-A 220 when the data unit 200 is a downlink data unit as compared to information included in the HE-SIG-A 220 when the data unit 200 is an uplink data unit. Additionally or alternatively, different information is included in the HE-SIG-A 220 when the data unit 200 is a multi-user data unit as compared to information included in the HE-SIG-A 220 when the data unit 200 is a single-user data unit, in an embodiment. In another embodiment, different information is included in the HE-SIG-B 222 when the data unit 200 is a downlink data unit as compared to the information is included in the HE-SIG-B 222 when the data unit 200 is an uplink data unit.

Figures 3A, 3B:
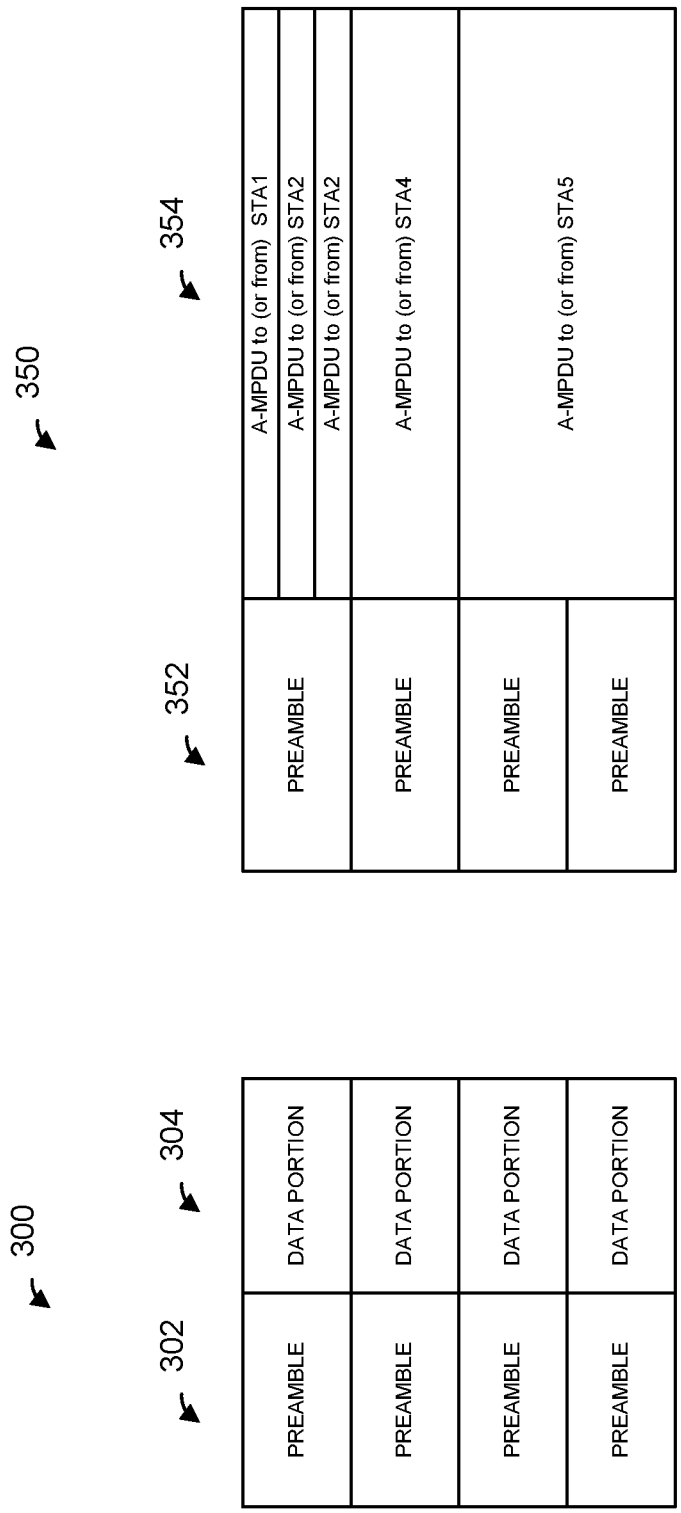
FIGS. 3A and 3B are block diagrams of example data units, according to some embodiments.

FIGS. 3A-3B are block diagrams of example data units that occupy an 80 MHz bandwidth, according to embodiments. Referring first to FIG. 3A, a data unit 300 includes a preamble portion 302 and a data portion 304. In an embodiment, the preamble portion 302 corresponds to a legacy preamble and conforms to a preamble format according to a legacy communication protocol, such as the IEEE 802.11a Standard, the IEEE 802.11n Standard, or the IEEE 802-11 ac Standard, for example, in an embodiment. In another embodiment, the preamble 302 corresponds to a non-legacy preamble that conforms to the IEEE 802.11ax Standard, for example. For example, in an embodiment, the preamble portion 302 includes a preamble such as the preamble 204 of FIG. 2. At least some fields in the preamble portion 302 are duplicated in each 20 MHz bandwidth of the data unit 300. For example, the preamble portion 302 includes an L-STF field, an L-LTF field, an L-SIG field and an HE-SIG-A field such as the L-STF field 205, the L-LTF field 210, the L-SIG field 215 and the HE-SIG-A field 220, respectively, and each of the L-STF field, the L-LTF field, the L-SIG field and the HE-SIG-A field is duplicated in each 20 MHz bands of the data unit 300, in an embodiment. In an embodiment, at least some fields in the preamble portion 302 are different in different 20 MHz bands of the data unit 300. For example, referring to FIG. 3A, at least a portion of the HE-SIG-B field 222, the HE-LTF fields 230 and the HE-SIG-C fields 235 are different in different 20 MHz bands of the data unit 300, in an embodiment.

The data portion 304 of the data unit 300 is duplicated in each 20 MHz band of the data unit 300, in an embodiment. In an embodiment, the data portion 304 includes a trigger frame that triggers uplink OFDMA transmission by a plurality of client stations 25. In an embodiment, the trigger frame includes information that indicates allocation of sub-channels to be used for uplink OFDMA transmission, in an embodiment. The trigger frame further indicates other transmission parameters to the multiple client stations 25, such as which modulation and coding scheme (MCS) each of the client stations should use, the OFDM numerology (e.g., guard interval, tone spacing, etc.) that each of the multiple client stations should use, transmit power that each of the multiple client stations 25 should use, etc. In an embodiment, the trigger frame is a duplicate broadcast frame transmitted to the multiple client stations 25 in each 20 MHz band of the data unit 300. In another embodiment, the trigger frame is a broadcast frame that occupies the entire 80 MHz bandwidth of the data unit 300.

Referring now to FIG. 3B, a data unit 350 includes a preamble portion 352 and a data portion 354. In an embodiment, the data portion 354 of the data unit 350 includes a plurality of aggregated MAC protocol data units (A-MPDU) respectively directed to ones of multiple client stations 25. In an embodiment, at least some of the A-MPDUs in the data portion 354 occupy sub-channels that span a width of less than 20 MHz. In an embodiment, a 20 MHz band in the preamble portion 354 spans multiple A-MPDUs in the data portion 354, in an embodiment. The data unit 350 is a downlink OFDMA data unit transmitted by the AP to a plurality of client stations 25, in an embodiment. In another embodiment, respective A-MPDUs in the data portion 354 and corresponding preamble portions 352 are transmitted by multiple client stations 25 as parts of an OFDMA transmission by multiple client stations 25.

In an embodiment in which the data unit 350 is a downlink OFDMA transmission to multiple client stations 25, at least some of the A-MPDUs include trigger frames, aggregated with data, to trigger uplink transmission by the client stations 25 to follow transmission of the data unit 350. The trigger frames in the data portion 350 are unicast trigger frames directed to respective ones of the multiple client stations 25, in an embodiment. In an embodiment, a trigger frame transmitted to a particular client station 25 includes information that indicates a sub-channel to be used for uplink transmission by the particular client station 25, in an embodiment. In an embodiment, the trigger frame to the particular client station 25 further includes information that indicates other transmission parameters for the particular client station 25, such as which modulation and coding scheme (MCS) the client station should use for uplink transmission, the OFDM numerology (e.g., guard interval, tone spacing, etc.) that the client station should use for uplink transmission, transmit power the client station 25 should use for uplink transmission, etc.

Additionally or alternatively, in an embodiment, the data portion 354 includes a subchannel, sometimes referred to as a control sub-channel, allocated for transmission of a broadcast trigger frame directed to multiple client stations 25. In this embodiment, at least some of the client stations 25 that are triggered for uplink OFDMA transmission by the trigger frame in the data unit 350 can be different from client stations 25 to which data is transmitted in the data unit 350.

Figure 4:
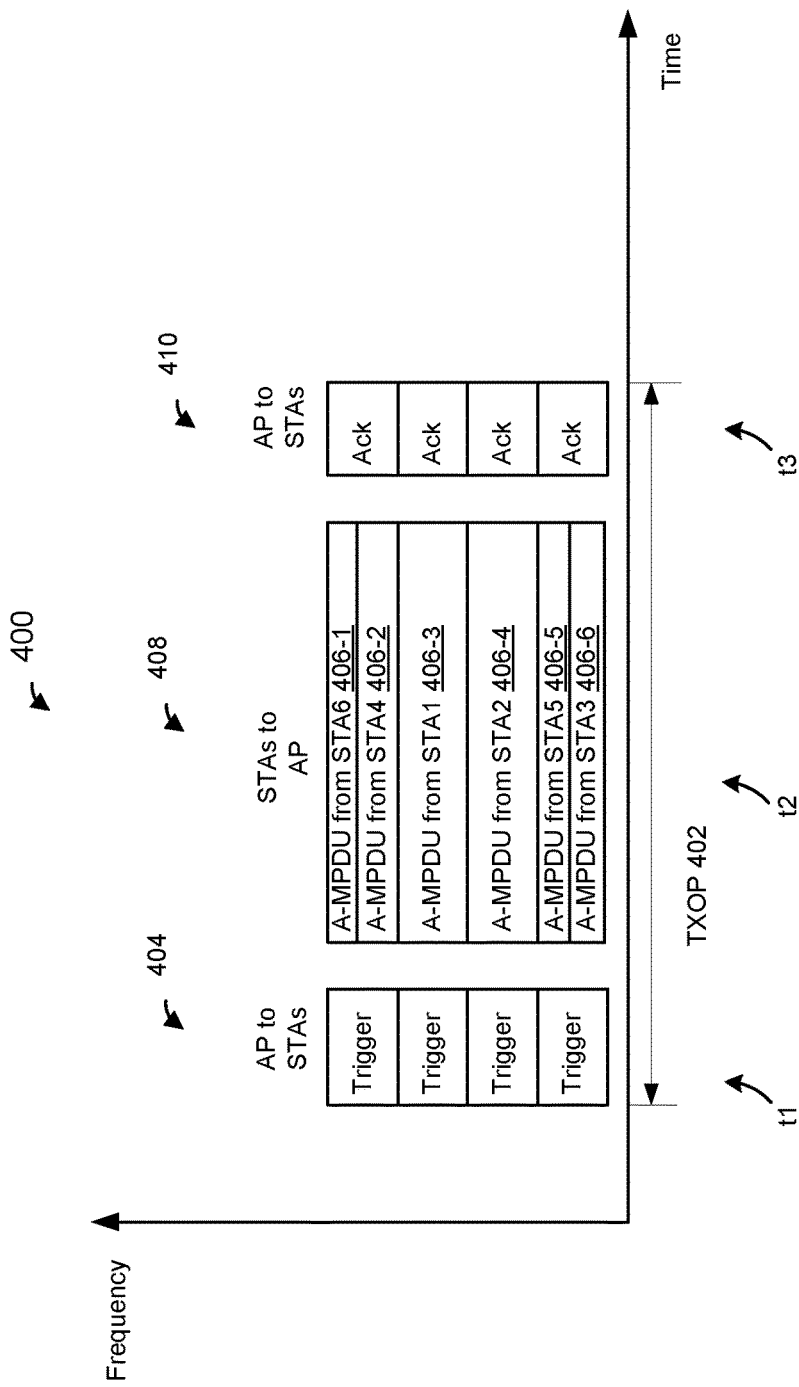
FIG. 4 is a diagram of an example transmission sequence in a WLAN, according to an embodiment.

FIG. 4 is a diagram of an example transmission sequence 400 in a WLAN, such as the WLAN 10 of FIG. 1, according to an embodiment, in which an AP, such as the AP 14, triggers a UL OFDMA transmission by multiple client stations, such as multiple ones of the client stations 25, during a transmission opportunity period (TXOP) 402. During a time t1, the AP 14 transmits a trigger frame 402 to a plurality of client stations 25. In an embodiment, the time t1 begins at the beginning of a TXOP obtained by (e.g., based on a suitable channel assessment procedure, such as CSMA/CA), or scheduled for, the AP 14. In an embodiment, the trigger frame 402 provides, to the plurality of client stations 25, resource unit allocation indication and other transmission parameters to be used for transmission of an uplink OFDMA data unit during the TXOP. In an embodiment, the trigger frame 402 is a MAC control frame that includes the uplink transmission information. In an embodiment, the MAC control frame is included in a data portion a data unit, such as the data portion 304 of the data unit 300 of FIG. 3A. In an embodiment, the trigger frame 402 is included in a physical layer convergence protocol (PLCP) protocol data unit (PPDU), such as a legacy PPDU that conforms to the IEEE 802.11a or IEEE 802.11n Standard, for example. In another embodiment, the trigger frame 402 is a null data packet (NDP) that includes uplink transmission information in a preamble, and omits a data portion. In an embodiment, the trigger frame 402 is included in a physical layer convergence protocol (PLCP) protocol data unit (PPDU), such as a legacy PPDU that conforms to the IEEE 802.11a or IEEE 802.11n Standard, for example. In an embodiment and/or scenario, the trigger frame 402 is duplicated in each narrowest channel bandwidth (e.g., in each 20 MHz) of the entire bandwidth of the TXOP. In an embodiment in which the trigger frame 402 is included in a legacy PPDU which is duplicated each narrowest channel bandwidth (e.g., in each 20 MHz) of the entire bandwidth of the TXOP, communication medium is protected from interference by any device in the network over the entire bandwidth of the TXOP, at least for the duration of transmission of the trigger frame 402, or for the duration of the entire TXOP. In another embodiment and/or scenario, the trigger frame 402 occupies the entire bandwidth of the TXOP, for example when each of the client stations 25 to which the trigger frame 402 is transmitted is capable of operating in the entire bandwidth of the TXOP. In an embodiment, a trigger frame that occupies the entire bandwidth of the TXOP is relatively shorter, and accordingly is transmitted in a relatively shorter time period, compared to a trigger frame that is duplicated in each narrowest channel bandwidth of the TXOP.

The trigger frame 402 indicates respective sub-channels allocated for uplink OFDMA transmission by six client stations STA1 through STA 6, in the illustrated embodiment. During a time t2, client stations STA1 through STA 6 transmit respective OFDM data unit, such as an A-MPDUs, 406 as parts of an OFDMA transmission 408 to the AP 14. In an embodiment, each A-MPDU 406 is included in a physical layer data unit transmitted by a corresponding client station 25. In an embodiment, the OFDMA transmission 408 has a format the same as or similar to the format of the data unit 350 of FIG. 3B. In another embodiment, the OFDMA transmission 408 has a suitable format different from the format of the data unit 350 of FIG. 3B.

Time t2 at each client station 25 begins upon expiration of a predetermined time interval, such as for example a time interval corresponding to a short inter-frame space (SIFS), after completion of reception of the trigger frame 402 at the client station 25, in an embodiment. In another embodiment, a predetermined time period that is greater than SIFS is defined, and time t2 at each client station 25 begins upon expiration of a predetermined time interval corresponding to the predetermined time interval greater than SIFS. For example, a predetermined time period that is greater than SIFS and less than point coordination function (PCF) inter-frame space (PIFS) is defined. The greater predetermined time interval may provide sufficient time for the client stations 25 to decode the trigger frame 402 and to prepare for uplink transmission based on the uplink scheduling information provided by the trigger frame 402, in at least some embodiments. Additionally or alternatively, the trigger frame 402 includes one or more padding bits at the end of the trigger frame 402 to provide sufficient time for the client stations 25 to prepare for uplink transmission based on the uplink scheduling information provided by the trigger frame 402, in some embodiments. For example, a MAC header included in the trigger frame 402 indicates a length of a valid payload, wherein the one or more padding bits follow the valid payload, in an embodiment. Further, a signal field of a PHY preamble of the trigger frame 402 includes an indication of the entire length of the trigger frame 402, which includes the one or more padding bits at the end of the trigger frame 402, in an embodiment.

In an embodiment, each client station transmits its OFDM data unit 406 during the time t2 in a respective sub-channel, allocated to the client station, as indicated in the trigger frame 402. In an embodiment, each client station transmits its OFDM data unit using transmission parameters, such as a modulation and coding scheme, a coding type, transmission power, length or duration of the data unit, etc. indicated in the trigger frame 402. In another embodiment, at least some of the client stations transmit OFDM data unit using at least some transmission parameters, such as a modulation and coding scheme, a coding type, transmission power, length or duration of the data unit, etc. determined by the client stations and not indicated in the trigger frame 402.

During a time t3, the AP 14 transmits respective ACK frames 410 to the client stations 25 (STA1 through STA6) acknowledging receipt of the OFDM data units 406 from the client stations 25. In another embodiment, the AP 14 transmits a broadcast acknowledgement frame that includes respective acknowledgements for the client stations 25 (STA1 through STA6). Time t3 begins upon expiration of a predetermined time interval, such as for example a time interval corresponding to a short inter-frame space (SIFS), after completion of reception of the OFDM data units 406 at the AP 14, in an embodiment. In an embodiment, the AP 14 transmits the ACK frame 410 to the client stations 25, as parts of an OFDMA transmission to the client statins 25, in the respective sub-channels allocated to the client stations 25 indicated in the trigger frame 402.

Trigger frames have suitable formats, such as formats described in U.S. patent application Ser. No. 14/961,380 and/or U.S. patent application Ser. No. 14/961,635, or other suitable formats, according to various embodiments. Trigger frames may include one or more fields for specifying one or more of i) a trigger type, ii) a length of the UL OFDMA transmission that is to follow the trigger frame, iii) one or more PHY parameters that are to be utilized, iv) RU allocations, etc., according to various embodiments. In some embodiments, trigger frames have different formats depending on the type UL transmission that is being triggered. For example, in some embodiments, certain fields are omitted from the trigger frame depending on the type of UL transmission that is to follow the trigger frame, and/or certain fields are included in the trigger frame depending on the type of UL transmission that is to follow the trigger frame.

In some embodiments, the trigger frame includes a trigger type field that indicates a type of response being triggered by the trigger frame. In an embodiment, the trigger frame indicates whether the trigger frame corresponds to a contention-based UL OFDMA transmission or some other type of transmission, such as a non-contention-based UL transmission from multiple client stations, a beamforming training transmission, an acknowledgement from client stations, or another suitable UL transmission. In an embodiment, a receiving device determines the trigger type of the trigger frame based on the trigger type field, and interprets a format of the trigger frame based on the determination of the trigger type.

In some embodiments, the trigger frame includes an UL PPDU length field that indicates a length or duration of the uplink data unit being triggered by the trigger frame, in an embodiment. In some embodiments, when trigger type field indicates a contention-based UL OFDMA transmission, the UL PPDU length field is omitted from the trigger frame. For example, in an embodiment, contention-based UL OFDMA transmissions have a predetermined length.

In some embodiments, the trigger frame includes one or more fields that indicate number(s) of spatial streams that respective client station(s) are to utilize when transmitting as part of the uplink data unit being triggered by the trigger frame, in an embodiment. In some embodiments, when trigger type field indicates a contention-based UL OFDMA transmission, the one or more fields that indicate number(s) of spatial streams are omitted from the trigger frame. For example, in an embodiment, contention-based UL OFDMA transmissions utilize a predetermined number of spatial streams.

In some embodiments, the trigger frame includes one or more fields that indicate modulation and coding scheme(s) (MCS(s)) that respective client station(s) are to utilize when transmitting as part of the uplink data unit being triggered by the trigger frame, in an embodiment. In some embodiments, when trigger type field indicates a contention-based UL OFDMA transmission, the one or more fields that indicate MCS(s) are omitted from the trigger frame. For example, in an embodiment, contention-based UL OFDMA transmissions utilize a predetermined MCS.

In some embodiments, the trigger frame includes one or more fields that indicate modulation scheme(s) that respective client station(s) are to utilize when transmitting as part of the uplink data unit being triggered by the trigger frame, in an embodiment. In some embodiments, when trigger type field indicates a contention-based UL OFDMA transmission, the one or more fields that indicate modulation scheme(s) are omitted from the trigger frame. For example, in an embodiment, contention-based UL OFDMA transmissions utilize a predetermined modulation scheme.

In some embodiments, the trigger frame includes one or more fields that indicate coding scheme(s) that respective client station(s) are to utilize when transmitting as part of the uplink data unit being triggered by the trigger frame, in an embodiment. In some embodiments, when trigger type field indicates a contention-based UL OFDMA transmission, the one or more fields that indicate coding scheme(s) are omitted from the trigger frame. For example, in an embodiment, contention-based UL OFDMA transmissions utilize a predetermined coding scheme.

In some embodiments, the trigger frame includes one or more fields that indicate forward error correction (FEC) technique(s) that respective client station(s) are to utilize when transmitting as part of the uplink data unit being triggered by the trigger frame, in an embodiment. In some embodiments, when trigger type field indicates a contention-based UL OFDMA transmission, the one or more fields that indicate FEC technique(s) are omitted from the trigger frame. For example, in an embodiment, contention-based UL OFDMA transmissions utilize a predetermined FEC technique.

In an embodiment, some or all resource units in an uplink transmission are allocated for contention-based access by the client stations 25. In this embodiment, after receiving a trigger for uplink transmission, a plurality of client stations 25 contend for the some or all contention-based resource units, and a client station 25 that obtains access to a particular contention-based resource unit participate in the triggered uplink OFDMA transmission, wherein the client station 25 transmits in the particular contention-based resource unit.

Figure 5:
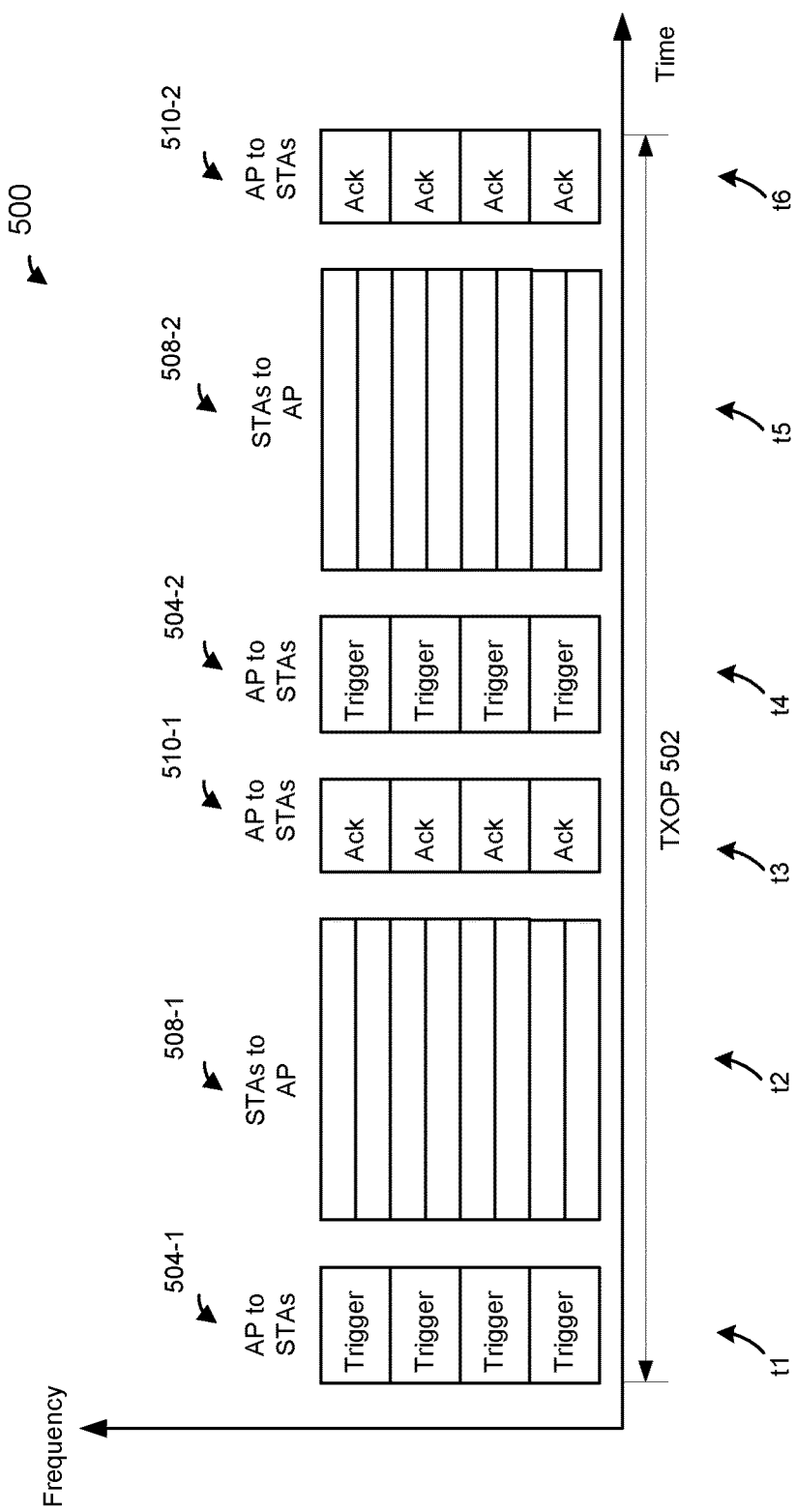
FIG. 5 is a block diagram of an example transmission sequence in a WLAN, according to another embodiment.

FIG. 5 is a diagram of an example transmission sequence 500 in a WLAN, such as the WLAN 10 of FIG. 1, according to an embodiment, in which an AP, such as the AP 14, triggers a UL OFDMA transmission by multiple client stations, such as multiple ones of the client stations 25, during a transmission opportunity period (TXOP) 502. In an embodiment, trigger frames 504 in the transmission sequence 500 are contention type trigger frames. In an embodiment, a trigger type indication included in a field in each trigger frame 504 indicates that the trigger frame 504 corresponds to a contention-based trigger frame and is formatted according to a predefined format for the contention-based trigger frame.

The trigger frame 504-1 is transmitted during time t1. The trigger frame 504-1 indicates respective sub-channels allocated for uplink OFDMA transmission by multiple client stations, in an embodiment. During a time t2, client stations transmit respective OFDM data units, such as an A-MPDUs, 406 as parts of an OFDMA transmission 508-1 to the AP 14. In an embodiment, each A-MPDU is included in a physical layer data unit transmitted by a corresponding client station 25. In an embodiment, the OFDMA transmission 508-1 has a format the same as or similar to the format of the data unit 350 of FIG. 3B. In another embodiment, the OFDMA transmission 508-1 has a suitable format different from the format of the data unit 350 of FIG. 3B.

Time t2 at each client station 25 begins upon expiration of a predetermined time interval, such as for example a time interval corresponding to a short inter-frame space (SIFS), after completion of reception of the trigger frame 504-1 at the client station 25, in an embodiment. In another embodiment, a predetermined time period that is greater than SIFS is defined, and time t2 at each client station 25 begins upon expiration of a predetermined time interval corresponding to the predetermined time interval greater than SIFS. In an embodiment, each client station transmits its OFDM data unit 508-1 during the time t2 in a respective sub-channel, allocated to the client station, as indicated in the trigger frame 504-1. In an embodiment, each client station transmits its OFDM data unit using transmission parameters, such as a modulation and coding scheme, a coding type, transmission power, length or duration of the data unit, etc. indicated in the trigger frame 504-1. In another embodiment, at least some of the client stations transmit OFDM data units 508-1 using at least some transmission parameters, such as a modulation and coding scheme, a coding type, transmission power, length or duration of the data unit, etc. determined by the client stations and not indicated in the trigger frame 504-1. In an embodiment, at least some of the client stations transmit OFDM data units 508-1 using at least some predetermined transmission parameters, such as a modulation and coding scheme, a coding type, transmission power, length or duration of the data unit, etc. specified by the first communication protocol for contention-based UL OFDMA transmissions.

During a time t3, the AP 14 transmits respective ACK frames 510-1 to the client stations 25 acknowledging receipt of the OFDM data units 508-1 from the client stations 25. In another embodiment, the AP 14 transmits a broadcast acknowledgement frame that includes respective acknowledgements for the client stations 25 (STA1 through STA6). Time t3 begins upon expiration of a predetermined time interval, such as for example a time interval corresponding to a short inter-frame space (SIFS), after completion of reception of the OFDM data units 508-1 at the AP 14, in an embodiment. In an embodiment, the AP 14 transmits the ACK frame 510-1 to the client stations 25, as parts of an OFDMA transmission to the client statins 25, in the respective sub-channels allocated to the client stations 25.

Similarly, the AP transmits trigger frame 504-2 during time t4. In an embodiment, each client station transmits its OFDM data unit 508-2 during the time t5 in a respective sub-channel, allocated to the client station, as indicated in the trigger frame 504-2. During a time t6, the AP 14 transmits respective ACK frames 510-2 to the client stations 25 acknowledging receipt of the OFDM data units 508-2 from the client stations 25.

Figure 6:
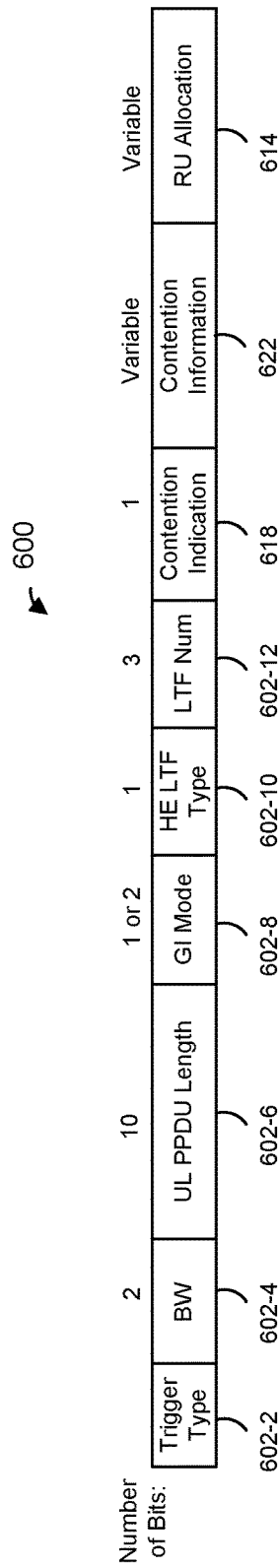
FIG. 6 is a block diagram of an example of a field included in a contention-based trigger frame, according to an embodiment.

FIG. 6 is a block diagram of a field 600 included in a contention-based trigger frame, such as in a contention-based trigger frames 504 of FIG. 5, according to an embodiment. The number of bits allocated to each subfield in the field 600, according to an example embodiment, is indicated above the corresponding subfield. Other suitable numbers of bits are allocated to at least some of the subfields, in other embodiments. In an embodiment, the field 600 is a common information field that includes information common to multiple client stations.

The field 600 includes a trigger type subfield 602-2, a bandwidth subfield 602-4, an uplink PPDU Length subfield 602-6, a GI mode subfield 602-8, an HE-LTF type subfield 602-10, and a number of LTFs subfield 602-12. The trigger type subfield 602-2 indicates a type of response being triggered by the trigger frame. In an embodiment, the trigger subfield 602-2 indicates whether the trigger frame corresponds to a basic trigger (e.g., a non-contention-based trigger), a contention-based trigger, a beamforming training trigger, an acknowledgement request trigger, etc. The content of the field 600 is different for different trigger types, in some embodiments. For example, in an embodiment, the subfields 602 of the field 600 illustrated in FIG. 6 are included in the field 600 when the trigger type subfield 602-2 indicates a basic trigger type, in an embodiment. In an embodiment, one or more of the subfields 602 illustrated in FIG. 6 are omitted from the field 600 and/or one or more additional subfields not illustrated in FIG. 6 are included in the field 600 when the trigger type subfield 602-2 indicates to a trigger type other than basic trigger type, such as contention-based trigger type or beamforming training trigger type. In an embodiment, a receiving device determines the trigger type of the trigger frame based on the trigger type subfield 602-2 in the field 600, and interprets at least some of the subfields of the trigger frame based on the determination of the trigger type.

With continued reference FIG. 6, the BW subfield 602-4 indicates a total bandwidth of the OFDMA uplink transmission being triggered by the trigger frame, in an embodiment. For example, the BW subfield 602-4 includes bits with values of logic "00" indicating a 20 MHz bandwidth, values of logic "01" indicating a 40 MHz bandwidth, values of logic "10" indicating an 80 MHz bandwidth, and values of logic "11" indicating a 160 MHz bandwidth, in an embodiment. In other embodiments, the BW subfield 602-4 includes other suitable number of bits and/or indicates suitable bandwidths other than 20 MHz, 40 MHz, 80 MHz and 160 MHz bandwidths. In some embodiments, the common information field 600 omits the BW subfield 602-4. For example, an alternative method of indicating the bandwidth is used, in some embodiments. As an example, in an embodiment, one or more bits of a scrambling seed field in a service field of a data unit that includes the trigger frame is used to indicate bandwidth, and a bit in a transmitter address field of the trigger frame is set to indicate that a bandwidth indication is included on the scrambler seed field, in an embodiment.

The UL PPDU Length subfield 602-6 indicates a length or duration of the uplink data unit being triggered by the trigger frame, in an embodiment. In an embodiment, the UL PPDU Length subfield 602-6 indicates the length or duration in terms of a number of OFDM symbols to be included in the uplink data unit. In another embodiment, the UL PPDU Length subfield 602-6 indicates the length or duration in terms of time. For example, in an embodiment, the UL PPDU Length subfield 602-6 includes an indication of a number of microseconds corresponding to a duration of the uplink data unit. In an embodiment, the UL PPDU Length subfield 602-6 includes nine bits to indicate a maximum duration. In another embodiment, the UL PPDU Length subfield 602-6 includes a suitable number of bits different from 9 bits, such as 10 bits or 8 bits, for example, or another suitable number of bits. In an embodiment, the UL PPDU Length subfield 602-6 is omitted from the field 600 when the trigger type subfield 602-2 indicates a contention-based trigger type.

The GI mode subfield 602-8 indicates a guard interval duration interval to be used in the uplink data unit, in an embodiment. For example, the GI mode subfield 602-8 includes two bits to indicate whether a 0.8 microseconds (us), a 1.6 us, 3.2 us, or another suitable guard interval duration, is to be used, in an example embodiment. In an embodiment, a receiving device determines the actual duration (e.g., in milliseconds) of the uplink data unit based on the value of the UL PPDU Length subfield 602-6 and the value of the GI mode subfield 602-8.

The LTF type subfield 602-10 indicates a mode of OFDM symbol compression (e.g., 1×, 2×, 4×, etc.) used with the LTF fields 230, in an embodiment. In another embodiment, LTF type indication is combined with GI indication, and the LTF type subfield 602-10 is omitted from the field 600. The number of LTFs subfield 602-12 indicates a total number of OFDM symbols spun by the LTF fields 230 in the data unit 200, in an embodiment. In an embodiment, the field 600 additionally includes one or more padding bits to ensure that the total number of bits in the field 600 is an integer multiple of an octet of bits (i.e., integer multiple of 8 bits). In another embodiment, the field 600 omits padding bits.

In an embodiment, the field 600 includes a resource unit allocation subfield 614. The resource allocation subfield 614 indicates resource units allocated for uplink transmission triggered by the trigger frame, in an embodiment. In an embodiment, the field 600 omits resource allocation to be used for the uplink transmission being triggered by the trigger frame. Resource allocation for respective client stations is included in a per-station information field of the trigger frame, for example, in an embodiment.

The field 600 includes a contention indication subfield 618 and a contention information subfield 622. In an embodiment, the contention indication subfield 618 indicates that all resource units indicated in the RU allocation subfield 614 are contention-based resource units available for contention by multiple client stations 25. For example, the contention indication subfield 618 includes a single bit set to a logic one ("1") to indicate that all resource units indicated in the RU allocation subfield 614 are contention-based resource units available for contention by multiple client stations 25, in an embodiment. In another embodiment, the contention indication subfield 618 includes a single bit set to a logic zero ("0") to indicate that all resource units indicated in the RU allocation subfield 614 are contention-based resource units available for contention by multiple client stations 25, in an embodiment.

In an example embodiment, the contention information subfield 622 includes a contention slot indication. In this embodiment, subsequent trigger frames, after a first trigger frame, need not be transmitted by the AP. Instead of using a trigger frame to subsequent contention-based uplink transmissions, client stations 25 simply begin contention at a time determined by the contention slot indication included in the contention information subfield 622 of the trigger frame.

Figure 7:
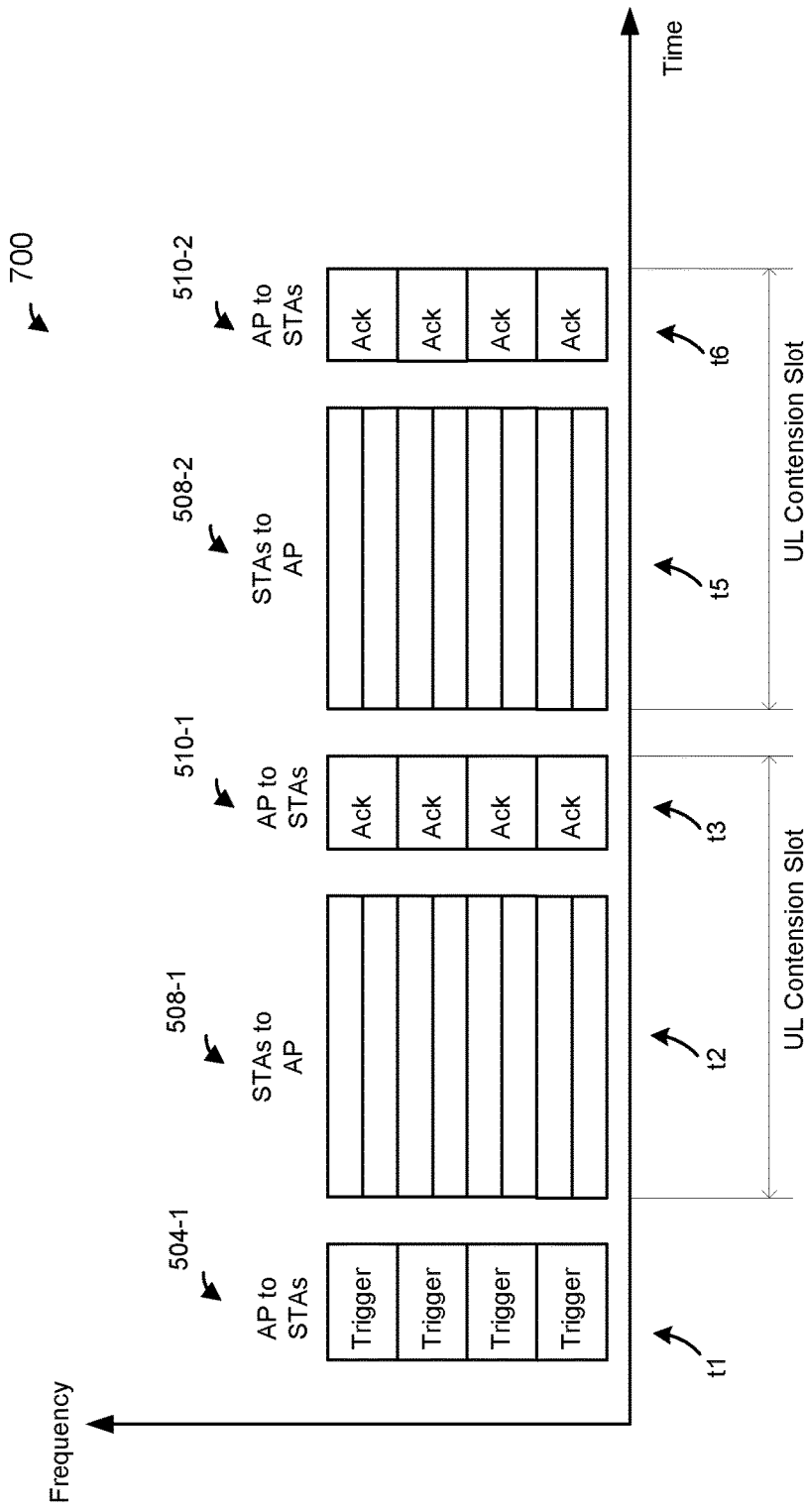
FIG. 7 is a block diagram of an example transmission sequence in a WLAN, according to an embodiment.

FIG. 7 is a diagram of an example transmission sequence 700 in a WLAN, such as the WLAN 10 of FIG. 1, according to an embodiment, in which an AP, such as the AP 14, triggers a UL OFDMA transmission by multiple client stations, such as multiple ones of the client stations 25, during a TXOP. The transmission sequence 700 is similar to the transmission sequence 500 of FIG. 5, except that the transmission sequence 700 omits the trigger frame 504-2. In an embodiment, client stations contend for subchannels corresponding to the resource units indicated in the trigger frame 504-1 and, the client stations 25 that gain access to the subchannels, transmit respective data to the AP 14 using the subchannels, during each of one or more contention slots indicated in the trigger frame 504-1. In an embodiment, a duration of each contention slot indicated in the trigger frame 504-1 includes a duration of an uplink transmission to the AP 14, a duration of a downlink acknowledgement frame from the AP 14, and a predetermined duration of an interframe time period, such as PIFS or SIFS, for example.

In another embodiment, a triggered uplink OFDMA transmission includes both (i) one or more contention-based resource units and (ii) one or more resource units allocated for transmission by specific client stations 25. For example, in an embodiment, when the trigger type subfield 602-2 included in the field 600 of a trigger frame indicates that the trigger frame is a contention-based trigger frame (e.g., configured to prompt an UL OFDMA frame in which at least some of allocated resource units are used for contention-based transmission), per-STA information fields include respective contention indications. In an embodiment, a contention indication in a particular per-STA information subfield is set to indicate whether the corresponding resource unit is a contention-based resource unit. Additionally or alternatively, a station ID subfield in a per-STA information field that corresponds to a contention-based resource unit includes a reserved value (e.g., 0) that indicates that the corresponding resource unit is a contention-based resource unit, in an embodiment.

In some embodiments, a communication device (e.g., the AP 14) receiving a contention-based UL OFDMA transmission does not acknowledge contention-based UL transmissions. Thus, referring to FIGS. 4, 5, and 7, one or more of acknowledgments 410 and/or 510 are omitted, according to various embodiments.

Figure 8:
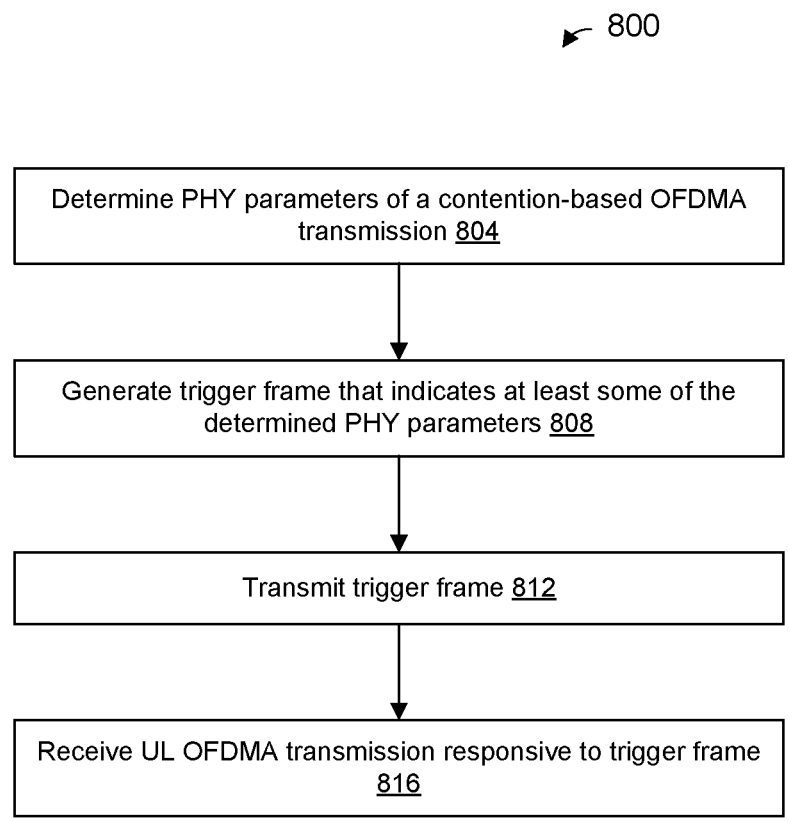
FIG. 8 is a flow diagram of an example method performed by a first communication device, the method including prompting multiple second communication devices to transmit as part of a contention-based orthogonal frequency division multiple access (OFDMA) transmission, according to an embodiment.

FIG. 8 is a flow diagram of an example method 800 performed by a first communication device, the method 800 associated with prompting multiple second communication devices to transmit as part of a contention-based OFDMA transmission, according to an embodiment. In some embodiments, the network interface device 16 of FIG. 1 is configured to implement the method 800, and merely for ease of explanation, the method 800 is described with reference to FIG. 1. For example, in some embodiments, the MAC processing unit 18 and/or the PHY processing unit 20 of FIG. 1 is configured to implement the method 800. However, the method 800 is utilized with and/or implemented in suitable systems and/or devices other than those described in connection with FIG. 1, in some embodiments.

At block 804, a first communication device determines one or more PHY parameters of a future contention-based OFDMA transmission that multiple second communication devices are to transmit to the first communication device. For example, in an embodiment, the network interface device 16 (e.g., the MAC processing unit 18 and/or the PHY processing unit 20) of the AP 14 determines one or more PHY parameters of a future contention-based UL OFDMA transmission from multiple client stations 25. In some embodiments, the future contention-based OFDMA transmission is to include only contention-based transmissions. In other embodiments, the future contention-based OFDMA transmission is to also include one or more non-contention-based transmissions along with one or more contention-based transmissions.

Block 804 includes determining RUs for the contention-based OFDMA transmission, according to some embodiments.

Block 804 includes determining a duration of the contention-based OFDMA transmission, according to some embodiments. For example, in some embodiments in which the future contention-based OFDMA transmission is to include one or more non-contention-based transmissions, the duration is determined based on a required duration(s) of the one or more non-contention-based transmissions.

In some embodiments, the first communication protocol specifies a set of predetermined durations for contention-based OFDMA transmissions, wherein a size of the set is significantly less than (e.g., at least an order of magnitude less than) a number of possible durations of non-contention-based OFDMA transmissions. Thus, in some embodiments, determining a duration of the contention-based OFDMA transmission includes selecting the duration from the set of predetermined durations for contention-based OFDMA transmissions specified by the first communication protocol.

In some embodiments in which the first communication protocol specifies different types of contention-based OFDMA transmissions (such as one or more of i) client station association-type contention-based OFDMA transmissions, ii) client station buffer information report-type contention-based OFDMA transmissions, iii) power save poll-type contention-based OFDMA transmissions, iv) another suitable type of contention-based OFDMA transmission, etc.), different types of contention-based OFDMA transmissions correspond to different durations. Thus, in some embodiments, determining a type of contention-based OFDMA transmission also determines a length of the contention-based OFDMA transmission.

In some embodiments, the first communication protocol specifies a single predetermined duration of all contention-based OFDMA transmissions. Thus, in some embodiments, block 804 does not include determining a duration of the contention-based OFDMA transmission.

In some embodiments, block 804 includes determining one or more modulation schemes that one or more second communication devices are to utilize when transmitting as part of the contention-based OFDMA transmission. In some embodiments, the first communication protocol specifies a single predetermined modulation scheme to be used for all contention-based OFDMA transmissions. Thus, in some embodiments, block 804 does not include determining modulation scheme(s) that one or more second communication devices are to utilize when transmitting as part of the contention-based OFDMA transmission.

In some embodiments, block 804 includes determining one or more coding schemes that one or more second communication devices are to utilize when transmitting as part of the contention-based OFDMA transmission. In some embodiments, the first communication protocol specifies a single predetermined coding scheme to be used for all contention-based OFDMA transmissions. Thus, in some embodiments, block 804 does not include determining coding scheme(s) that one or more second communication devices are to utilize when transmitting as part of the contention-based OFDMA transmission.

In some embodiments, block 804 includes determining one or more MCSs that one or more second communication devices are to utilize when transmitting as part of the contention-based OFDMA transmission. In some embodiments, the first communication protocol specifies a single predetermined MCS to be used for all contention-based OFDMA transmissions. Thus, in some embodiments, block 804 does not include determining MCS(s) that one or more second communication devices are to utilize when transmitting as part of the contention-based OFDMA transmission.

In some embodiments, block 804 includes determining one or more FEC techniques that one or more second communication devices are to utilize when transmitting as part of the contention-based OFDMA transmission. In some embodiments, the first communication protocol specifies a single FEC technique to be used for all contention-based OFDMA transmissions. Thus, in some embodiments, block 804 does not include determining FEC techniques(s) that one or more second communication devices are to utilize when transmitting as part of the contention-based OFDMA transmission.

In some embodiments, block 804 includes determining power control information that one or more second communication devices are to utilize when transmitting as part of the contention-based OFDMA transmission. In some embodiments, however, block 804 does not include determining power control information that one or more second communication devices are to utilize when transmitting as part of the contention-based OFDMA transmission.

In some embodiments, PHY parameters of the contention-based OFDMA transmission are predetermined. For example, in some embodiments, the first communication protocol species PHY parameters of all contention-based OFDMA transmissions. Thus, in some embodiments, block 804 is omitted.

At block 808, the first communication device generates a trigger frame to prompt the contention-based OFDMA transmission from multiple second communication devices. For example, in an embodiment, the network interface device 16 (e.g., the MAC processing unit 18 and/or the PHY processing unit 20) of the AP 14 generates the trigger frame. In some embodiments, the trigger frame is configured to prompt an UL OFDMA transmission that includes only contention-based transmissions. In other embodiments, the trigger frame is configured to prompt an UL OFDMA transmission that includes one or more non-contention-based transmissions along with one or more contention-based transmissions.

In some embodiments, the trigger frame generated at block 808 has a format the same as or similar to a format discussed with reference to FIG. 2 and/or FIG. 3A. In other embodiments, the trigger frame has another suitable format.

In some embodiments, the trigger frame is generated to include indication(s) of at least some of the PHY parameters determined at block 804. For example, in some embodiments, one or more of the PHY parameters determined at block 804 are transmitted to second communication device in previous communications, such as one or more control frames, one or more management frames, one or more previous trigger frames, etc., transmitted prior to transmission of the trigger frame generated at block 808. Thus, in some embodiments, indications of one or more of the PHY parameters determined at block 804 and transmitted to second communication devices in one or more previous communication frames are not included in the trigger frame generated at block 808. In some embodiments, one or more explicit indications of one or more of the PHY parameters determined at block 804 are not included in the trigger frame generated at block 808, where such one or more of the PHY parameters can be inferred by other information included in the trigger frame, such as a trigger frame type (e.g., a type of contention-based OFDMA transmission that the trigger frame is configured to prompt).

In some embodiments, the trigger frame generated at block 808 does not include any indications of PHY parameters of the contention-based OFDMA transmission determined by the first communication device. For example, as discussed above, block 804 is omitted in some embodiments. As another example, as discussed above, indications of one or more PHY parameters determined at block 804 are transmitted in one or more previous communication frames, such as one or more control frames, one or more management frames, one or more previous trigger frames, etc. As another example, as discussed above, one or more PHY parameters determined at block 804 can be inferred by second communication devices, according to some embodiments. For example, one or more PHY parameters determined at block 804 can be inferred by other information in the trigger frame, such a type of contention-based OFDMA transmission that the trigger frame is prompting.

At block 812, the first communication device transmits the trigger frame generated at block 808. For example, in an embodiment, the network interface device 16 (e.g., the PHY processing unit 20) of the AP 14 transmits the trigger frame. In some embodiments, the MAC processing unit 18 causes (e.g., prompts) the PHY processing unit 20 to transmit the trigger frame.

At block 816, the first communication device receives the contention-based OFDMA transmission. For example, in an embodiment, the network interface device 16 (e.g., the MAC processing unit 18 and/or the PHY processing unit 20) of the AP 14 receives and processes the contention-based OFDMA transmission. The contention-based OFDMA transmission is processed by the first communication device assuming that the contention-based OFDMA transmission was generated according to one or more PHY parameters determined at block 804. In some embodiments, the contention-based OFDMA transmission received at block 816 the same as or similar to a format discussed with reference to FIG. 2 and/or FIG. 3B. In other embodiments, the contention-based OFDMA transmission has another suitable format. For example, as described in more detail below, the contention-based OFDMA transmission includes one or more random access sequences corresponding to one or more of second communication devices.

Referring now to FIG. 2, in some embodiments, at least some transmissions included in the contention-based OFDMA transmission omit the HE-SIG-C field 235. In embodiments in which the HE-SIG-C field 235 is included, however, the HE-SIG-C field 235 includes one or more PHY parameters according to which a second communication device generated the data unit 200 (e.g., an MCS). Thus, in some embodiments, the first communication device utilizes information in the HE-SIG-C field 235 to process the contention-based OFDMA transmission.

Figure 9:
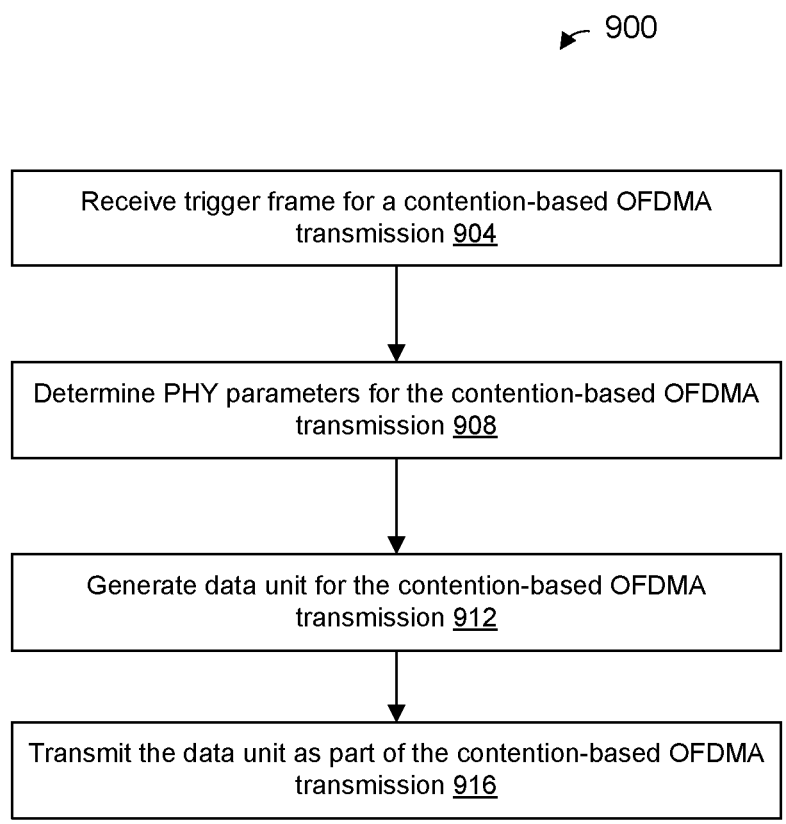
FIG. 9 is a flow diagram of an example method performed by a first communication device, the method including transmitting as part of a contention-based OFDMA transmission to a second communication device, according to an embodiment.

FIG. 9 is a flow diagram of an example method 900 performed by a first communication device, the method 900 associated with a contention-based OFDMA transmission to a second communication device, according to an embodiment. In some embodiments, the network interface device 27 of FIG. 1 is configured to implement the method 900, and merely for ease of explanation, the method 900 is described with reference to FIG. 1. For example, in some embodiments, the MAC processing unit 28 and/or the PHY processing unit 29 of FIG. 1 is configured to implement the method 900. However, the method 900 is utilized with and/or implemented in suitable systems and/or devices other than those described in connection with FIG. 1, in some embodiments.

At block 904, the first communication device receives a trigger frame from the second communication device (e.g., the AP 14), the trigger frame prompting the first communication device to transmit as part of a contention-based OFDMA transmission from multiple communication devices. For example, in an embodiment, the network interface device 27 (e.g., the PHY processing unit 29) receives the trigger frame. In some embodiments, the trigger frame is configured to prompt an UL OFDMA transmission that includes only contention-based transmissions. In other embodiments, the trigger frame is configured to prompt an UL OFDMA transmission that includes one or more non-contention-based transmissions along with one or more contention-based transmissions.

In some embodiments, the trigger frame received at block 904 has a format the same as or similar to a format discussed with reference to FIG. 2 and/or FIG. 3A. In other embodiments, the trigger frame has another suitable format.

At block 908, the first communication device determines one or more PHY parameters of a contention-based transmission that the first communication device is to transmit to in response to the trigger frame received at block 904. For example, in an embodiment, the network interface device 27 (e.g., the MAC processing unit 28 and/or the PHY processing unit 29) of the station 25-1 determines one or more PHY parameters of a future transmission that the client station 25-1 is to transmit as part of the contention-based UL OFDMA transmission prompted by the trigger frame received at block 904.

Block 908 includes determining one or more RUs corresponding to the transmission by the first communication device, according to some embodiments. In some embodiments, the trigger frame received at block 904 includes indication(s) of the one or more RUs. In other embodiments, however, the trigger frame received at block 904 does not include indication(s) of the one or more RUs. In some embodiments, a previously received communication frame(s) (e.g., a control frame, a management frame, a previous trigger frame, etc.) includes one or more indication(s) of the one or more RUs, and block 908 includes using the indication(s) of the one or more RUs from the previously received frame(s) to determine the duration of the contention-based OFDMA transmission.

Block 908 includes determining a duration of the contention-based OFDMA transmission, according to some embodiments. For example, in some embodiments, the trigger frame received at block 904 includes an indication of the duration. In other embodiments, however, the trigger frame received at block 904 does not include an indication of the duration. In some embodiments, a previously received communication frame (e.g., a control frame, a management frame, a previous trigger frame, etc.) includes an indication of the duration, and block 908 includes using the indication of the duration from the previously received frame to determine the duration of the contention-based OFDMA transmission.

In some embodiments, the first communication protocol specifies a set of predetermined durations for contention-based OFDMA transmissions, wherein a size of the set is significantly less than (e.g., at least an order of magnitude less than) a number of possible durations of non-contention-based OFDMA transmissions. For example, in some embodiments, the trigger frame received at block 904 includes an indication of a selected duration from the set of predetermined durations, and block 908 includes using the indication of the selected duration to determine the duration of the contention-based OFDMA transmission.

In some embodiments, the first communication protocol specifies different types of contention-based OFDMA transmissions (such as one or more of i) client station association-type contention-based OFDMA transmissions, ii) client station buffer information report-type contention-based OFDMA transmissions, iii) power save poll-type contention-based OFDMA transmissions, iv) another suitable type of contention-based OFDMA transmission, etc.), different types of contention-based OFDMA transmissions correspond to different durations. For example, in some embodiments, the trigger frame received at block 904 includes an indication of a type of contention-based OFDMA transmission, and block 908 includes using the indication of the type of contention-based OFDMA transmission to determine the duration of the contention-based OFDMA transmission.

In some embodiments, the first communication protocol specifies a single predetermined duration of all contention-based OFDMA transmissions. Thus, in some embodiments, block 908 includes determining a duration of the contention-based OFDMA transmission as the single predetermined duration.

In some embodiments, block 908 includes determining a modulation scheme that is to be utilized when transmitting as part of the contention-based OFDMA transmission. In some embodiments, the first communication protocol specifies a single predetermined modulation scheme to be used for all contention-based OFDMA transmissions. Thus, in some embodiments, block 908 includes determining a modulation scheme to be utilized for the contention-based OFDMA transmission as the single predetermined modulation scheme.

In some embodiments, block 908 includes determining a coding scheme that is to be utilized when transmitting as part of the contention-based OFDMA transmission. In some embodiments, the first communication protocol specifies a single predetermined coding scheme to be used for all contention-based OFDMA transmissions. Thus, in some embodiments, block 908 includes determining a coding scheme to be utilized for the contention-based OFDMA transmission as the single predetermined coding scheme.

In some embodiments, block 908 includes determining an MCS that is to be utilized when transmitting as part of the contention-based OFDMA transmission. In some embodiments, the first communication protocol specifies a single predetermined MCS to be used for all contention-based OFDMA transmissions. Thus, in some embodiments, block 908 includes determining an MCS to be utilized for the contention-based OFDMA transmission as the single predetermined MCS.

In some embodiments, block 908 includes determining an FEC technique that is to be utilized when transmitting as part of the contention-based OFDMA transmission. In some embodiments, the first communication protocol specifies a single FEC technique to be used for all contention-based OFDMA transmissions. Thus, in some embodiments, block 908 includes determining an FEC technique to be utilized for the contention-based OFDMA transmission as the single predetermined FEC technique.

In some embodiments, block 908 includes determining a power at which to transmit as part of the contention-based OFDMA transmission. In some embodiments, the trigger frame received at block 904 includes power control information, and block 908 includes determining the power at which to transmit using the power control information in the trigger frame received at block 904. In some embodiments, however, the trigger frame received at block 904 does not include power control information. For example, in some embodiments, power control information is received in a previous communication frame (e.g., a previously received control frame, a previously received management frame, a previously received trigger frame, etc.), and block 908 includes determining the power at which to transmit using the power control information in the previously received communication frame. Determining a power at which to transmit as part of the contention-based OFDMA transmission is described in more detail below.

In some embodiments, PHY parameters of the contention-based OFDMA transmission are predetermined. For example, in some embodiments, the first communication protocol specifies PHY parameters of all contention-based OFDMA transmissions. Thus, in some embodiments, block 908 includes determining one or more PHY parameters specified by the first communication protocol for all contention-based OFDMA transmissions.

At block 912, the first communication device generates a data unit according to the PHY parameters determined at block 908. For example, in an embodiment, the network interface device 27 (e.g., the MAC processing unit 28 and/or the PHY processing unit 29) of the station 25-1 generates the data unit according to the PHY parameters determined at block 908.

In some embodiments, the data unit generated at block 912 has a format the same as or similar to a format discussed with reference to FIG. 2 and/or FIG. 3B. In other embodiments, the data unit has another suitable format. For example, as described in more detail below, the contention-based OFDMA transmission includes one or more random access sequences corresponding to the first communication device.

Referring now to FIG. 2, in some embodiments, the transmission generated at block 912 omits the HE-SIG-C field 235. In embodiments in which the HE-SIG-C field 235 is included, however, the HE-SIG-C field 235 includes one or more PHY parameters according to which the first communication device generated the data unit 200 (e.g., an MCS). Thus, in some embodiments, the HE-SIG-C field 235 provides information (e.g., indications of PHY parameters) for the second communication device to utilize to process the contention-based OFDMA transmission.

At block 916, the first communication device transmits the data unit generated at block 912 as part of the contention-based OFDMA transmissions. For example, in an embodiment, the network interface device 27 (e.g., the PHY processing unit 29) transmits the data unit. In some embodiments, the MAC processing unit 28 causes (e.g., prompts) the PHY processing unit 29 to transmit the data unit.

As discussed above, in some embodiments, in response to receiving a trigger frame, client stations 25 transmit random access sequences. Referring now to FIG. 1, for example, network interface 27, in response to receiving a trigger frame, determines a random access sequence, generates an OFDM data unit that includes the random access sequence, and transmits the OFDM data unit. In some embodiments, the network interface 16 identifies the random access sequence and decodes the random access sequence into useable information. As an illustrative example, in an embodiment, the network interface 27 determines that it is to inform the AP 14 that the client station 25 is awake. Thus, the network interface 27 determines a random access sequence corresponding to an "awake" signal and, in response to receiving a contention-based trigger frame, transmits a data unit that includes the random access sequence corresponding to the "awake" signal as part of a contention-based UL OFDMA transmission. The AP identifies the random access sequence as corresponding to the "awake" signal in the received contention-based UL OFDMA transmission and determines that the client station 25-1 is "awake", in an embodiment.

In some embodiments, the network interface 27 is configured to generate a random access sequence based on a base sequence (sometimes referred to herein as "a base function"). In various embodiments, examples of a base sequence include i) a code-spread sequence, ii) a Zadoff-Chu sequence, iii) a Gold sequence, iv) a discrete Fourier transform (DFT) sequence, etc. In various embodiments, examples of a base sequence include a suitable combination of two or more of i) a code-spread sequence, ii) a Zadoff-Chu sequence, iii) a Gold sequence, iv) a DFT sequence, etc.

In some embodiments, random access sequences are pseudo-random sequences.

In some embodiments, a base sequence is selected (e.g., from a set of base sequences) at a client station 25-1 based on a duration of a contention-based UL OFDMA transmission. In some embodiments, a particular base sequence is selected based on a type of contention-based UL OFDMA transmission. For instance, in an embodiment, a client station 25, in response to receiving a contention-based trigger frame that indicates a particular type of contention-based UL OFDMA transmission, selects a particular sequence (e.g., from a set of base sequences corresponding to different types of contention-based UL OFDMA transmissions) for generation of a random access sequence to be transmitted as part of the contention-based UL OFDMA transmission. In some embodiments, a base sequence is selected additionally or alternatively based on one or more other suitable selection criteria.

In an embodiment, generation of the random access sequence further includes modifying the selected base sequence using a set of one or more parameters corresponding to the client station 25-1. In various embodiments, the set of parameters includes one or more of i) an identifier of the client station 25-1, ii) a parameter corresponding to a frequency resource to be used by the client station when transmitting as part of the contention-based UL OFDMA transmission, iii) timing information corresponding to transmitting as part of the contention-based UL OFDMA transmission, etc. According to various embodiments, the identifier (ID) of the client station 25-1 includes one or more of i) a MAC address of the client station 25-1, ii) and ID assigned to the client station 25-1 by the AP 14 (e.g., an association ID (AID)), a partial AID (PAID), an ID selected by the client station 25-1 (e.g., randomly or pseudo-randomly selected), or any other suitable identifier. According to various embodiments, the parameter corresponding to a frequency resource includes one or more of i) a subchannel number, ii) a size (e.g., a bandwidth) of the frequency resource, iii) a number of subchannels, etc. According to various embodiments, timing information corresponding to transmitting as part of the contention-based UL OFDMA transmission includes one or more of i) a frame number corresponding to the contention-based UL OFDMA transmission, ii) a timestamp corresponding to the contention-based UL OFDMA transmission, etc. In other embodiments, other suitable parameters used for modifying the selected base sequence include one or more of i) a basis service set ID (BSSID) corresponding to the network 10, ii) a type of the contention-based uplink OFDMA transmission (e.g., a message type, a message ID, etc.), etc.

In an embodiment, determining a random access sequence includes determining a length of the random access sequence. In an embodiment, a length of the random access sequence is determined, by a client station, such as the client station 25-1, from a received trigger. In an embodiment, a length of the random access sequence is determined, by a client station, such as the client station 25-1, from a field in a received trigger, such as the UL PPDU Length field 602-6 described above. In an embodiment, a length of the random access sequence is determined by a client station, such as the client station 25-1, based on the type of the uplink OFDMA transmission.

In some embodiments, random access sequences are generated in a manner that ensures that random access sequences generated at a first client station 25, such as client station 25-1, are at most weakly correlated to random access sequences generated at a second client station, such as client station 25-2. In some embodiments, random access sequences are generated in a manner that ensures that random access sequences generated at a first client station, such as client station 25-1, and random access sequences generated at a second client station, such as client station 25-2, have a zero or substantially zero cross correlation coefficient. In some embodiments, a random access sequence generated at a first client station using a first set of parameters is at most weakly correlated to a random access sequence generated at the first client station using a second set of parameters. In some embodiments, a random access sequence generated at a first client station using a first set of parameters and a random access sequence generated at the first client station using a second set of parameters have a zero or substantially zero cross correlation coefficient.

Properties of random access sequences such as at least some of the properties described in the previous paragraph help increase the probability that the AP 14 is able to identify a particular client station 25 accessing the contention-based channel. Additionally and/or alternatively, in some embodiments, properties of random access sequences such as at least some of the properties described in the previous paragraph help increase the probability that the AP 14 is able to identify which one of multiple different sequences a particular client station 25 is transmitting. For example, in some embodiments, properties of random access sequences such as at least some of the properties described in the previous paragraph help increase the probability that the AP 14 is able to identify which one of multiple different messages ("awake", "going to sleep", "power save poll", etc.) the client station 25 is conveying. For example, in some embodiments, properties of random access sequences such as at least some of the properties described in the previous paragraph help increase the probability that the AP 14 is able to identify parameters the client station 25 used to generate the random access sequence. Based on the identified parameters, the AP 14 can determine which client station 25 transmitted a particular sequence and/or which one of multiple different messages is being conveyed, according to various embodiments. The AP 14 can then perform one or more subsequent non-contention-based frame exchanges with the client station 25 if needed, according to some embodiments. In some embodiments, a "collision" might occur between two uplink OFDM data units from two different client stations, such as client station 25-1 and client station 25-2, when the two uplink OFDM data units occupy a same contention-based channel. In such a situation and in some circumstances, the AP 14 is able to identify at least one of the client station 25-1 and the client station 25-2 (e.g., one of the client stations 25-1, 25-2 with a stronger signal strength) and performs one or more subsequent non-contention-based frame exchanges with the at least one client station.

Generation of an OFDM data unit as part of a contention-based UL OFDMA transmission includes mapping of a random access sequence to frequency-time opportunities of contention-based UL OFDMA transmission. For example, in an embodiment, the AP 14 allocates certain frequency resources (e.g. subcarriers) and time resources (e.g. OFDM symbols) in contention-based UL OFDMA transmission for the client station 25. In an embodiment, the client station 25 maps a base sequence to the allocated frequency and time resources.

In an embodiment, elements of the base sequence are mapped to a first allocated subcarrier in each OFDM symbol in the RU, then mapped to a second allocated subcarrier in each OFDM symbol in the RU, then mapped to a third allocated subcarrier in each OFDM symbol in the RU, etc. If a random access sequence is represented by $s_m(\theta)$, wherein in is an index of the sequence, m=0, 1, 2, . . . , M, M is a length of the sequence, and $\theta$ includes a set of parameters utilized to generate the sequence, a mapping operation can be represented as:

$$S_{k(i),n} = S_{i \cdot N_{SYM,base}+n}(\theta), \quad 0 \leq n \leq N_{SYM,base}-1 \leq N_{SYM,RA}-1 \qquad \text{Equ. 1}$$

where, $S_{k(i),n}$ represents the base sequence mapped to frequency-time opportunities, k(i) is a subcarrier index corresponding to an i-th allocated subcarrier in an RU within which the sequence is included, n is an OFDM symbol index, $N_{SYM,base}$ is a total number of OFDM symbols across which the sequence is mapped, $N_{SYM,RA}$ is a total number of OFDM symbols in the RU, $0 \leq i \leq N_{tone,base} \leq N_{tone,RA}$, $N_{tone,base}$ is a total number of subcarriers across one or more OFDM symbols used for the sequence, and $N_{tone,RA}$ is a total number of subcarriers across one or more OFDM symbols in the RU.

In another embodiment, elements of the base sequence are first mapped to all allocated subcarriers in a first OFDM symbol in the RU, then mapped to all allocated subcarriers in a second OFDM symbol in the RU, then mapped to all allocated subcarriers in a third OFDM symbol in the RU, etc. This mapping operation can be represented as:

$$S_{k(i),n} = S_{n \cdot N_{tone,base}+i}(\theta), \ 0 \leq n \leq N_{tone,base}-1 \qquad \text{Equ. 2}$$

In an embodiment, a length of a base sequence may be chosen to be a fixed parameter. In another embodiment, a length of a base sequence may be chosen from a set of predetermined set of lengths. In some embodiments, a length of a base sequence can be set to be an arbitrary value by a communication device, such as the AP 14 and/or the client station 25.

In an embodiment, the length of a random access sequence may be less than the number of frequency-time opportunities in a random access signal of an uplink OFDMA transmission. In an embodiment, a random sequence can be extended to fill up all the frequency time opportunities in a random access signal of an uplink OFDMA transmission. In an embodiment, a base sequence is extended by repeating the elements of the base sequence. In an embodiment, repeating the elements of the base sequence includes multiplying the repeated elements by a different scalar at each repetition. In an embodiment, repeating the elements of the base sequence includes reordering the elements of the base sequence at each repetition. In an embodiment, repeating the elements of the base sequence includes performing any other suitable operation on repeated elements of the base sequence. In various embodiments, repeating the elements of the base sequence includes a combination of two or more operations such as describe above. For example, in some embodiments, repeating the elements of the base sequence includes a combination of two or more of i) multiplying by a different scalar at each repetition, ii) reordering elements at each repetition, and iii) another suitable operation. In an embodiment, if a non-integer number of repetitions are necessary, padding bits/symbols are added after the last integer repetition to fill up all frequency time opportunities.

In an embodiment, a random access sequence is extended by concatenating it with another random access sequence modified by a different set of parameters. For instance, a random access sequence j, generated by modifying a base sequence with a first set of parameters, is concatenated with a second random access sequence k that is generated by modifying the base sequence with a second set of parameters. In such embodiments, a concatenation of multiple different random access sequences continues until all frequency-time opportunities are filled. In an embodiment, if a non-integer number of concatenations are necessary, padding bits/symbols are utilized such as described above.

In an illustrative embodiment, a base sequence is a code spreading function. In an embodiment, the code spreading function is selected from a set of L codes, each of a length M. In an embodiment, a code spreading function is represented by:

$$\Omega = \{\underline{c}^{(1)}, \underline{c}^{(2)}, \ldots, \underline{c}^{(L)}\}; \ \underline{c}^{(j)} = [c_0^{(j)}, c_1^{(j)}, \ldots, c_{M-1}^{(j)}], \\ 1 \leq j \leq L \qquad \text{Equ. 4}$$

where j is a code spreading function index. Based on a set of parameters, a code is selected, from the set of L codes, to be utilized by the client station 25 as a random access sequence. For instance, in response to determining, at the client station 25-1, that the random access sequence is to be generated for transmitting an association request to the AP 14, a code $\underline{c}^{(2)}$ is selected, where the code $\underline{c}^{(2)}$ is known by the AP 14 to correspond to association requests, according to an illustrative embodiment. In an embodiment, the code $\underline{c}^{(2)}$ is known by the AP 14 to also correspond to the station 25-1. In response to determining, at the client station 25-1, that the random access sequence is to be generated for transmitting a PS-Poll, a code $\underline{c}^{(5)}$ is selected, where the code $\underline{c}^{(5)}$ is known by the AP 14 to correspond to PS-Polls, according to an illustrative embodiment. In an embodiment, the code $\underline{c}^{(5)}$ is known by the AP 14 to also correspond to the station 25-1. In other embodiments, a different code is selected in response to determining a different message is to be transmitted from the client station 25-1. In other embodiments, a code to be used for the random access sequence is signaled by an AP, such as an AP 14. In other embodiments, a specific code is fixed and always used by the client station 25-1.

After selection of a code from the set of code spreading functions, elements of the code are mapped to frequency-time opportunities of an OFDM data unit in a contention-based uplink OFDMA transmission using techniques such as described above, or using other suitable techniques, according to various embodiments.

In another illustrative embodiment, a base sequence is a Zadoff-Chu sequence. In an embodiment, the base sequence, represented by $s_m(\theta)$, where m is an index of the base sequence and $\theta$ represents a set of parameters utilized to generate the random access sequence, such as client station 25-1, is of length M, and is given by the equation:

$$s_m(\theta) = s_m(j) = e^{-j\frac{\pi q m(m+1)}{M}}; \ 0 \leq m \leq M-1 \qquad \text{Equ. 5}$$

where j is a single parameter. As an illustrative example, in response to determining, at the client station 25-1, that the random access sequence is to be generated for transmitting an association request to an AP 14, a first value of j is used. In response to determining, at the client station 25-1, that the random access sequence is to be generated for transmitting a PS-Poll, a second value of j is used. In other embodiments, different values of j are used in response to determining different messages are to be transmitted from the client station 25-1. In other embodiments, a set of values of j to be used for random access sequences is signaled by the AP 14 to the client station 25-1. In other embodiments, the set of values of j is predetermined and always used by the client station 25-1.

After generation of a random access sequence using the Zadoff-Chu base sequence and a set of parameters $\theta$ (e.g., a value of j), elements of the code are mapped to frequency-time opportunities of an OFDM data unit in a contention-based uplink OFDMA transmission using techniques such as described above, or using other suitable techniques, according to various embodiments. In an illustrative embodiment, elements of the random access sequence are mapped to each allocated subcarrier of an OFDM symbol, and then mapped to each allocated subcarrier of a next OFDM symbol of the OFDM data unit, and so on. In an embodiment, a mapping operation is represented as:

$$S_{k(i),n} = s_m(j), \text{ where } k(i) = k(m \mod N_{tone,RA}), \ n = \lfloor m/N_{tone,RA} \rfloor \qquad \text{Equ. 6}$$

In another embodiment, another mapping operation is represented as:

$$S_{k(i),n} = s_m(j), \text{ where } k(i) = k\left(\left\lfloor \frac{m}{N_{SYM,RA}} \right\rfloor\right), n = m \bmod N_{SYM,RA} \quad \text{Equ. 7}$$

In an embodiment, repetition of the random access sequence and/or padding is performed if M is less than the number of frequency-time opportunities in the RU. After all the frequency-time opportunities of an OFDM data unit in an uplink OFDMA transmission are filled, the OFDM data unit is generated and transmitted by a client station, such as the client station 25-1.

In an embodiment, the AP 14 determines the type of random access signals—regular data units or random access sequences, that the client stations 25 are allowed to transmit in response to receiving a contention based trigger frame. In an embodiment, an AP, such as the AP 14, determines that the client stations 25 should transmit random access sequences, and further determines the type of random access sequences that the client stations 25 are allowed to transmit in response to receiving a contention based trigger frame. In such embodiments, the AP signals to client stations 25 the type of random access signals that client stations 25 are allowed to transmit in response to receiving a contention based trigger frame.

In some embodiments, the client stations 25 determine the type of random access signals based on the type of the contention-based uplink OFDMA transmission that are to be transmitted from the client stations 25 in response to receiving a contention-based trigger frame. In some embodiments, a client station 25 determines the type of contention-based transmission to be transmitted based on the information the client station 25 will be transmitting. For instance, in an embodiment, a client station 25, in response to receiving a contention-based trigger frame, generates and transmits one or more random access sequences in an OFDM data unit when it needs to transmit an association request, but generates and transmits a regular OFDM data unit when it needs to transmit a buffer report.

In some embodiments, the client station 25-1 generates an OFDM data unit having PHY preamble, where one or more random access sequences are included in a PHY data portion of the OFDM data unit. For example, with reference to FIG. 2, in some embodiments, the client station 25-1 generates an OFDM data unit having a format as discussed above with reference to FIG. 2, where one or more random access sequences are included in the PHY data portion 240. In various embodiments, the client station 25-1 generates the OFDM data unit that (includes one or more random access sequences) to omit a portion of the PHY preamble, or to omit all of the PHY preamble.

In some embodiments, the AP 14 processes one or more random access sequences included in a contention-based UL OFDMA transmission to determine one or more of i) which client station 25 transmitted the one or more random access sequences, and ii) particular information being conveyed by the client station 25. For example, in an embodiment, the network interface device 16 is configured to perform cross-correlations of a random access sequence in a contention-based UL OFDMA transmission with a plurality of other sequences known a priori by the network interface device 16 to correspond with particular devices and/or with particular messages. In response to determining a cross-correlation result of a random access sequence in a contention-based UL OFDMA transmission with particular sequence meets (e.g., exceeds) a threshold, the network interface device 16 determines that the random access sequence in the contention-based UL OFDMA transmission was transmitted by a particular client station 25 known a priori to correspond with the particular sequence and/or that that the random access sequence in the contention-based UL OFDMA transmission conveys a particular message known a priori to correspond with the particular sequence.

In some embodiments, the network interface 16 processes one or more random access sequences included in a contention-based UL OFDMA transmission to determine one or more parameters utilized by a client station 25 to generate the one or more random access sequences. Then, in some embodiments, the network interface 16 determines which client station 25 transmitted the one or more random access sequences and/or which message(s) are being conveyed using the determined one or more parameters.

Contention for frequency and time resources by multiple client station can lead to a near-far problem under certain circumstances. For instance, transmissions originating from a first client station, such as the client station 25-1, can have a higher signal strength at an AP than transmissions originating from a second client station, such as the client station 25-2, that is located farther away from the AP 14 than the first client station. In some situations, this can lead to the second client station 25-2 being unable to access frequency and time resources when competing with client station 25-1. In such a scenario, it is helpful for the client station 25-2 to increase its transmission power, and/or for the client station 25-1 to reduce its transmission power.

Transmission power control is achieved using open-loop control techniques, closed-loop control techniques, or a combination of open-loop control techniques and closed-loop control techniques, according to various embodiments. In an embodiment, open-loop power control is achieved by allocating transmit powers to the client stations, such as the client stations 25, without using any feedback information regarding a channel state. In an embodiment, closed-loop power control is achieved by using feedback information, such as power attenuation information, for transmissions between the client stations 25 and the access point 14.

An AP, such as an AP 14, transmits power control information to a client station, such as the client station 25-1, for enabling closed-loop power control, in some embodiments. In an embodiment, the AP 14 indicates, to the client station 25-1, transmit power of a downlink transmission from the AP 14 to the client station 25-1 and the target received power at the AP 14 for uplink transmissions from the client station 25-1 to the AP 14. In an embodiment, the AP 14 indicates one or more other parameters R that can be used for power control at the client station 25-1. In an embodiment, the AP 14 indicates power control information in a SYNC frame or a trigger frame, such as the trigger frame 404 of FIG. 4, and/or one or more of the trigger frames 504 of FIGS. 5 and 7. In an embodiment, the AP 14 indicates the power control information in any other frame before a trigger frame, such as a control frame, a management frame, etc. In some embodiments, the power control information is predetermined and known a priori at the client station 25-1.

In an embodiment, the client station 25-1, measures power received in a downlink transmission from the AP 14, and based on transmit power information (e.g. a transmit power of the AP 14) indicated in the downlink transmission, estimates the power attenuation in the form of path loss, PL. Using the estimated PL, maximum transmit power of the client station 25-1, $P_{max}$, known at the client station 25-1, and target received power at the AP 14 for uplink transmissions from the client station 25-1, the client station 25-1 calculates transmit power for an uplink transmission from the client station 25-1, according to an embodiment. For instance, if the transmit power of the trigger frame (sometimes referred to herein as a "SYNC frame") from the AP 14 is given by $P_{TX}^{(SYNC)}$ and the power of the trigger frame received at the client station 25-1 is measured at the $P_{RX}^{(SYNC)}$, the path loss is given by:

$$PL = P_{RX}^{(SYNC)} - P_{TX}^{(SYNC)} \qquad \text{Equ. 8}$$

In an embodiment, the client station 25-1 can then calculate the transmit power $P_{TX}^{(UL)}$ of an uplink transmission, such as an OFDM data unit of an uplink OFDMA transmission, by using an equation:

$$P_{TX}^{(UL)} = \min(P_{max}, P_{RX,target}^{(UL)} - PL) \qquad \text{Equ. 9}$$

where $P_{RX,target}^{(UL)}$ is a target received power at the AP 14 for uplink transmissions from the client station 25-1 to the AP 14, and is indicated in a SYNC frame from the AP 14 or another suitable communication frame. In an embodiment, the client station 25-1 can calculate the transmit power $P_{TX}^{(UL)}$ of an uplink transmission, such as an OFDM data unit of an uplink OFDMA transmission, by using a function f:

$$P_{TX}^{(UL)} = f(P_{max}, P_{RX,target}^{(UL)}, PL, R) \qquad \text{Equ. 10}$$

In an embodiment where the client station 25-1 has multiple transmit antennas, transmit power calculation also takes into account multiple antenna gains of the multiple transmit antennas. In an embodiment, the transmit power calculation at the client station 25-1 also takes into account the size of the frequency resources (e.g., number of OFDM subcarriers, channel bandwidth) used for the uplink transmissions from the client station 25-1.

In an embodiment, a client station, such as the client station 25-1, uses frames other than an immediate SYNC frame or trigger frame to calculate the transmit power for an uplink transmission from the client station 25-1. For instance, the client station 25-1 measures and averages path loss PL over multiple trigger frames and/or other suitable communication frames from the AP 14. The client station 25-1 calculates transmit power for an uplink transmission from the client station 25-1 using the average PL of multiple frames, maximum transmit power of the client station 25-1, $P_{max}$, known at the client station 25-1, and target received power at the AP 14 for uplink transmissions from the client station 25-1. In an embodiment, the client station 25-1 uses any other function of the target received power at the AP 14 for uplink transmissions from the client station 25-1 and the path loss PL to estimate the transmit power for an uplink transmission.

In an embodiment, an AP, such as the AP 14, indicates multiple target received powers at the AP for uplink transmissions from client stations, such as the client stations 25. In an embodiment, each target received power of the multiple target received powers corresponds to a client station or a group of client stations. For instance, the client station 25-1 is in a group of client stations assigned a target received power $P_{RX,target,1}^{(UL)}$ and the client station 25-2 is in a group of client stations assigned a target received power $P_{RX,target,2}^{(UL)}$. In an embodiment, a client station 25 is assigned to a group based on a priority of uplink transmissions from the particular client station 25. In an embodiment, a client station 25 is assigned to a group based on a distance from the access point 14.

In an embodiment, each target received power of multiple target received powers corresponds to a type of contention-based signal (sometimes referred to herein as a "random access signal") or a group of multiple types of contention-based signals to be transmitted from the client stations 25. For instance, regular data unit-type random access signals to be transmitted in response to a trigger frame are assigned to a group with target received power $P_{RX,target,1}^{(UL)}$, and random access signals comprising random access sequences to be transmitted in response to a trigger frame are assigned to a group with target received power $P_{RX,target,2}^{(UL)}$. In an embodiment, random access signals to be transmitted in response to a trigger frame are assigned to a group based on a type of information to be conveyed (e.g., an association request, a buffer report, a PS Poll, etc.). In an embodiment, each target received power of the multiple target received powers corresponds to a priority of transmission. For instance, a greater target received power is assigned to a random access signal with a higher priority and a smaller target received power is assigned to a random access signal with a lower priority.

In an embodiment, a target received power from multiple target received powers to be used for setting transmit power at the client station 25 is signaled/pre-assigned by the AP 14. In an embodiment, a target received power is determined by the AP 14 using a type of random access signal to be transmitted by the client station 25 in response to a trigger frame, and the AP 14 signals the target received power to the client station 25. In an embodiment, a target received power is determined by the AP 14 using a distance of the client station 25 from the AP 14, and the AP 14 signals the target received power to the client station 25. In an embodiment, a target received power is determined by the AP 14 using a path loss of uplink transmissions from the client station 25, and the AP 14 signals the target received power to the client station 25.

In an embodiment, a target received power to be used for setting the transmit power at the client station 25 is autonomously selected at the client station 25 from multiple target received powers. For instance, the client station 25-1 determines that a regular data unit is to be transmitted in response to a trigger frame and generates a random access signal comprising the regular data unit using a target received power $P_{RX,target,1}^{(UL)}$. In an embodiment, the client station 25-1 determines that a random access sequence is to be transmitted in response to a trigger frame and generates a random access signal comprising the random access sequence using a target received power $P_{RX,target,2}^{(UL)}$. In an embodiment, a client station 25-1 selects a target received power in a manner that attempts to avoid interfering (or reduce interference) with transmissions other client stations 25 and/or communications in other nearby wireless networks.

In some embodiments, in addition to or instead of selecting and/or transmitting indications of multiple target received powers, an AP, such as the AP 14 can select and/or transmit to client stations, such as client stations 25, other power-associated parameters. For instance, in some embodiments, the AP 14 can select and/or transmit to client stations 25 multiple path loss scaling factors. In an embodiment, each path loss scaling factor of the multiple path loss scaling factors corresponds to a client station or a group of client of stations. In an embodiment, each path loss scaling factor of the multiple path loss scaling factors corresponds to a type of random access signal or a group of multiple types of random access signals to be transmitted from the client stations 25. In an embodiment, a path loss scaling factor from the multiple path loss scaling factors is used for setting transmit power at the client station 25. In an embodiment, a path loss scaling factor from the multiple path loss scaling factors to be used for setting transmit power at the client station 25 is signaled/pre-assigned by the AP 14. In an embodiment, a path loss scaling factor to be used for setting the transmit power at the client station 25 is autonomously selected at the client station 25 from multiple path loss scaling factors.

In an embodiment, the above closed-loop power control procedure is performed in communication frames different than SYNC frames and trigger frames. In an embodiment, power control information is transmitted in a communication frame prior to a trigger frame, such as a control frame, a management frame, etc. In some such embodiments, transmission of closed-loop power control occurs less frequently than in embodiments in which closed-loop power control information is transmitted in trigger frames.

In an embodiment, a method for communicating in a wireless communication network includes: generating, at a first communication device, a trigger frame to trigger a contention-based uplink orthogonal frequency multiple access (OFDMA) transmission by multiple second communication devices, wherein the trigger frame is configured to indicate a predetermined length of the contention-based uplink OFDMA transmission, and the predetermined length corresponds to contention-based uplink OFDMA transmissions; transmitting, with the first communication device, the trigger frame to the multiple second communication devices; and receiving, at the first communication device, the contention-based uplink OFDMA transmission, wherein the contention-based uplink OFDMA transmission is of the predetermined length.

In other embodiments, the method includes one of or any suitable combination of two or more of the following features.

A communication protocol, according to which the first communication device and the multiple second communication devices are configured to operate, specifies that all contention-based uplink OFDMA transmissions are to have the predetermined length.

A communication protocol, according to which the first communication device and the multiple second communication devices are configured to operate, specifies that all contention-based uplink OFDMA transmissions are to utilize one or more of i) a predetermined number of spatial streams, ii) a predetermined type of error correction coding, and iii) a predetermined modulation and coding scheme.

The method further includes: selecting, at the first communication device, the predetermined length of the contention-based uplink OFDMA transmission from a set of multiple predetermined lengths corresponding to contention-based uplink OFDMA transmissions, wherein the set of multiple predetermined lengths is smaller than a set of possible lengths of non-contention-based uplink OFDMA transmissions; and including, at the first communication device, an indication of the selected predetermined length in a field of the trigger frame.

The set of multiple predetermined lengths corresponds to a set of multiple types of contention-based uplink OFDMA transmissions; selecting the predetermined length of the contention-based uplink OFDMA transmission from the set of multiple predetermined lengths comprises selecting, at the first communication device, a type of contention-based uplink OFDMA transmission from the set of multiple types of contention-based uplink OFDMA transmissions; and including the indication of the selected predetermined length in the field of the trigger frame comprises including, at the first communication device, an indication of the selected type of contention-based uplink OFDMA transmission in a field of the trigger frame that is reserved for indicating a type of contention-based uplink OFDMA transmission that the trigger frame is configured to prompt.

The method further includes: determining, at the first communication device, power control information associated with transmission of the contention-based uplink OFDMA transmission; and transmitting, with the first communication device, the power control information to one or more second communication devices.

Transmitting the power control information to one or more second communication devices comprises transmitting the power control information in the trigger frame.

Receiving the contention-based uplink OFDMA transmission includes receiving a sequence of values included in the contention-based uplink OFDMA transmission; and the method includes processing, at the first communication device, the sequence of values to determine which second communication device transmitted the sequence of values.

Processing the sequence of values comprises correlating, at the first communication device, the sequence of values included in the contention-based uplink OFDMA transmission with another sequence corresponding to a particular second communication device.

The other sequence also corresponds to a particular message from a set of multiple messages; and the method further includes determining whether the particular second communication device conveyed the particular message based on a result of correlating the sequence of values included in the contention-based uplink OFDMA transmission with the other sequence.

In another embodiment, an apparatus comprises a network interface device associated with a first communication device. The network interface device includes one or more integrated circuits configured to: generate a trigger frame to trigger a contention-based uplink orthogonal frequency multiple access (OFDMA) transmission by multiple second communication devices, wherein the trigger frame is configured to indicate a predetermined length of the contention-based uplink OFDMA transmission, and the predetermined length corresponds to contention-based uplink OFDMA transmissions; transmit the trigger frame to the multiple second communication devices; and receive the contention-based uplink OFDMA transmission, wherein the contention-based uplink OFDMA transmission is of the predetermined length.

In other embodiments, the apparatus comprises one of or any suitable combination of two or more of the following features.

A communication protocol, according to which the first communication device and the multiple second communication devices are configured to operate, specifies that all contention-based uplink OFDMA transmissions are to have the predetermined length.

A communication protocol, according to which the first communication device and the multiple second communication devices are configured to operate, specifies that all contention-based uplink OFDMA transmissions are to utilize one or more of i) a predetermined number of spatial streams, ii) a predetermined type of error correction coding, and iii) a predetermined modulation and coding scheme.

The one or more integrated circuits are further configured to: select the predetermined length of the contention-based uplink OFDMA transmission from a set of multiple predetermined lengths corresponding to contention-based uplink OFDMA transmissions, wherein the set of multiple predetermined lengths is smaller than a set of possible lengths of non-contention-based uplink OFDMA transmissions; and include an indication of the selected predetermined length in a field of the trigger frame.

The set of multiple predetermined lengths corresponds to a set of multiple types of contention-based uplink OFDMA transmissions; and the one or more integrated circuits are further configured to: select a type of contention-based uplink OFDMA transmission from the set of multiple types of contention-based uplink OFDMA transmissions, and include an indication of the selected type of contention-based uplink OFDMA transmission in a field of the trigger frame that is reserved for indicating a type of contention-based uplink OFDMA transmission that the trigger frame is configured to prompt.

The one or more integrated circuits are further configured to: determine power control information associated with transmission of the contention-based uplink OFDMA transmission; and transmit the power control information to one or more second communication devices.

The one or more integrated circuits are further configured to include the power control information in the trigger frame.

The one or more integrated circuits are further configured to: receive a sequence of values included in the contention-based uplink OFDMA transmission; and process the sequence of values to determine which second communication device transmitted the sequence of values.

The one or more integrated circuits are further configured to: correlate the sequence of values included in the contention-based uplink OFDMA transmission with another sequence corresponding to a particular second communication device; and determine whether the particular second communication device transmitted the sequence of values based on a result of correlating the sequence of values included in the contention-based uplink OFDMA transmission with the other sequence.

The other sequence also corresponds to a particular message from a set of multiple messages; and the one or more integrated circuits are further configured to determine whether the particular second communication device conveyed the particular message based on the result of correlating the sequence of values included in the contention-based uplink OFDMA transmission with the other sequence.

In yet another embodiment, a method for communicating in a wireless communication network includes: receiving, at a communication device, a trigger frame configured to: trigger a contention-based uplink orthogonal frequency multiple access (OFDMA) transmission by multiple communication devices, and indicate a predetermined length of the contention-based uplink OFDMA transmission, wherein the predetermined length corresponds to contention-based uplink OFDMA transmissions. The method also includes: responsive to receiving the trigger frame, generating, at the communication device, a data unit having the predetermined length; and responsive to receiving the trigger frame, transmitting, with the communication device, the data unit as part of a contention-based uplink OFDMA transmission.

In other embodiments, the method includes one of or any suitable combination of two or more of the following features.

A communication protocol, according to which the communication device is configured to operate, specifies that all contention-based uplink OFDMA transmissions are to have the predetermined length.

A communication protocol, according to which the communication device is configured to operate, specifies that all contention-based uplink OFDMA transmissions are to utilize one or more of i) a predetermined number of spatial streams, ii) a predetermined type of error correction coding, and iii) a predetermined modulation and coding scheme.

The method further includes: selecting, at the communication device, the predetermined length from a set of multiple predetermined lengths using an indication of the predetermined length in a field of the trigger frame; wherein the set of multiple predetermined lengths corresponds to contention-based uplink OFDMA transmissions, and the set of multiple predetermined lengths is smaller than a set of possible lengths of non-contention-based uplink OFDMA transmissions.

The set of multiple predetermined lengths corresponds to a set of multiple types of contention-based uplink OFDMA transmissions; the indication of the predetermined length in the field of the trigger frame comprises an indication of a type of contention-based uplink OFDMA transmission in a field of the trigger frame; and selecting the predetermined length from the set of multiple predetermined lengths comprises selecting the predetermined length from the set of multiple predetermined lengths using the indication of the type of contention-based uplink OFDMA transmission.

The method further includes: determining, at the communication device, power control information associated with transmission of the data unit as part of the contention-based uplink OFDMA transmission; and controlling, at the communication device, a transmit power level when transmitting the data unit as part of the contention-based uplink OFDMA transmission, wherein controlling the transmit power level is in accordance with the power control information.

Determining the power control information comprises receiving, at the communication device, at least some of the power control information from an access point.

Generating the data unit comprises: generating a sequence of values using one or more parameters; and mapping the sequence of values to orthogonal frequency division multiplexing (OFDM) subcarriers and OFDM symbols.

A first parameter among the one or more parameters corresponds to an identifier of the communication device.

A second parameter among the one or more parameters corresponds to a particular message being conveyed by the communication device in the contention-based uplink OFDMA transmission.

In still another embodiment, an apparatus comprises a network interface device associated with a communication device. The network interface device includes one or more integrated circuits configured to: receive a trigger frame configured to: trigger a contention-based uplink orthogonal frequency multiple access (OFDMA) transmission by multiple communication devices, and indicate a predetermined length of the contention-based uplink OFDMA transmission, wherein the predetermined length corresponds to contention-based uplink OFDMA transmissions. The one or more integrated circuits are also configured to: generate a data unit having the predetermined length in response to receiving the trigger frame; and transmit the data unit as part of a contention-based uplink OFDMA transmission in response to receiving the trigger frame.

In other embodiments, the apparatus comprises one of or any suitable combination of two or more of the following features.

A communication protocol, according to which the communication device is configured to operate, specifies that all contention-based uplink OFDMA transmissions are to have the predetermined length.

A communication protocol, according to which the communication device is configured to operate, specifies that all contention-based uplink OFDMA transmissions are to utilize one or more of i) a predetermined number of spatial streams, ii) a predetermined type of error correction coding, and iii) a predetermined modulation and coding scheme.

The one or more integrated circuits are also configured to select the predetermined length from a set of multiple predetermined lengths using an indication of the predetermined length in a field of the trigger frame; and the set of multiple predetermined lengths corresponds to contention-based uplink OFDMA transmissions, and the set of multiple predetermined lengths is smaller than a set of possible lengths of non-contention-based uplink OFDMA transmissions.

The set of multiple predetermined lengths corresponds to a set of multiple types of contention-based uplink OFDMA transmissions; the indication of the predetermined length in the field of the trigger frame comprises an indication of a type of contention-based uplink OFDMA transmission in a field of the trigger frame; and the one or more integrated circuits are also configured to select the predetermined length from the set of multiple predetermined lengths using the indication of the type of contention-based uplink OFDMA transmission.

The one or more integrated circuits are also configured to: determine power control information associated with transmission of the data unit as part of the contention-based uplink OFDMA transmission; and control a transmit power level when transmitting the data unit as part of the contention-based uplink OFDMA transmission, wherein controlling the transmit power level is in accordance with the power control information.

Determining the power control information comprises receiving at least some of the power control information from an access point.

The one or more integrated circuits are also configured to generate the data unit at least by: generating a sequence of values using one or more parameters, and mapping the sequence of values to orthogonal frequency division multiplexing (OFDM) subcarriers and OFDM symbols.

A first parameter among the one or more parameters corresponds to an identifier of the communication device.

A second parameter among the one or more parameters corresponds to a particular message being conveyed by the communication device in the contention-based uplink OFDMA transmission.

In yet another embodiment, a method for communicating in a wireless communication network includes: receiving, at a communication device, a trigger frame configured to: trigger a contention-based uplink orthogonal frequency multiple access (OFDMA) transmission by multiple communication devices; and responsive to receiving the trigger frame, generating, at the communication device, a data unit, including generating a sequence of values that indicates a contention-based transmission. Generating the sequence of values includes using one or more parameters. The method also includes, responsive to receiving the trigger frame, transmitting, with the communication device, the data unit as part of a contention-based uplink OFDMA transmission.

In other embodiments, the method includes one of or any suitable combination of two or more of the following features.

Generating the data unit comprises: mapping the sequence of values to orthogonal frequency division multiplexing (OFDM) subcarriers and OFDM symbols.

A first parameter among the one or more parameters corresponds to an identifier of the communication device.

A second parameter among the one or more parameters corresponds to a particular message being conveyed by the communication device in the contention-based uplink OFDMA transmission.

The method further includes: determining, at the communication device, power control information associated with transmission of the data unit as part of the contention-based uplink OFDMA transmission; and controlling, at the communication device, a transmit power level when transmitting the data unit as part of the contention-based uplink OFDMA transmission, wherein controlling the transmit power level is in accordance with the power control information.

Determining the power control information comprises receiving, at the communication device, at least some of the power control information from an access point.

In still another embodiment, an apparatus comprises a network interface device associated with a communication device. The network interface device includes one or more integrated circuits configured to: receive a trigger frame configured to trigger a contention-based uplink orthogonal frequency multiple access (OFDMA) transmission by multiple communication devices. The one or more integrated circuits are also configured to: generate a data unit having the predetermined length in response to receiving the trigger frame, including generating a sequence of values that indicates a contention-based transmission. Generating the sequence of values includes using one or more parameters. The one or more integrated circuits are also configured to: transmit the data unit as part of a contention-based uplink OFDMA transmission in response to receiving the trigger frame.

In other embodiments, the apparatus comprises one of or any suitable combination of two or more of the following features.

Generating the data unit comprises: mapping the sequence of values to orthogonal frequency division multiplexing (OFDM) subcarriers and OFDM symbols.

A first parameter among the one or more parameters corresponds to an identifier of the communication device.

A second parameter among the one or more parameters corresponds to a particular message being conveyed by the communication device in the contention-based uplink OFDMA transmission.

In yet another embodiment, a method for communicating in a wireless communication network includes: generating, at a first communication device, a trigger frame to trigger a contention-based uplink orthogonal frequency multiple access (OFDMA) transmission by multiple second communication devices; and transmitting the trigger frame to the multiple second communication devices. The method also includes receiving, at the first communication device, the contention-based uplink OFDMA transmission, wherein the contention-based uplink OFDMA transmission includes a contention-based transmission from one of the second communication devices, the contention-based transmission including a sequence of values that indicates a contention-based transmission. The method further includes processing, at the first communication device, the sequence of values to determine at least one of i) that the contention-based transmission was transmitted by the one second communication device, and ii) a message being conveyed by the one second communication device.

In other embodiments, the method includes one of or any suitable combination of two or more of the following features.

Processing the sequence of values comprises processing to the sequence of values to determine a first parameter used by the one second communication device to generate the sequence of values. The method further includes determining that the first parameter corresponds to an identifier of the one second communication device.

Processing the sequence of values comprises processing to the sequence of values to determine a second parameter used by the one second communication device to generate the sequence of values. The method further includes determining that the second parameter corresponds to a particular message being conveyed by the one second communication device in the contention-based uplink OFDMA transmission.

In another embodiment, an apparatus comprises a network interface device associated with a first communication device. The network interface device includes one or more integrated circuits configured to: generate a trigger frame to trigger a contention-based uplink orthogonal frequency multiple access (OFDMA) transmission by multiple second communication devices; and transmit the trigger frame to the multiple second communication devices. The one or more integrated circuits are also configured to receive the contention-based uplink OFDMA transmission, wherein the contention-based uplink OFDMA transmission includes a contention-based transmission from one of the second communication devices, the contention-based transmission including a sequence of values that indicates a contention-based transmission. The one or more integrated circuits are also configured to process the sequence of values to determine at least one of i) that the contention-based transmission was transmitted by the one second communication device, and ii) a message being conveyed by the one second communication device.

Processing the sequence of values comprises processing to the sequence of values to determine a first parameter used by the one second communication device to generate the sequence of values. The method further includes determining that the first parameter corresponds to an identifier of the one second communication device.

Processing the sequence of values comprises processing to the sequence of values to determine a second parameter used by the one second communication device to generate the sequence of values. The method further includes determining that the second parameter corresponds to a particular message being conveyed by the one second communication device in the contention-based uplink OFDMA transmission.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a wireless communication network, the method comprising:
generating, at a first communication device, a trigger frame to trigger an uplink orthogonal frequency multiple access (OFDMA) transmission,
wherein the trigger frame is configured to indicate that multiple second communication devices can contend for a contiguous band of OFDM tones as part of the uplink OFDMA transmission,
wherein the trigger frame includes power control information that includes i) a transmission power value that indicates a transmission power used by the first communication device to transmit the trigger frame and ii) a target received power value that indicates a target received power, at the first communication device, for the uplink OFDMA transmission, and
wherein the power control information, including i) the transmission power value, and ii) the target received power value, is for use by communication devices participating in the uplink OFDMA transmission to determine respective transmission power levels for the uplink OFDMA transmission;
transmitting, with the first communication device, the trigger frame; and
receiving, at the first communication device, the uplink OFDMA transmission in response to the trigger frame.

2. The method of claim 1, wherein:
a communication protocol, according to which the first communication device and the multiple second communication devices are configured to operate, specifies that all contention-based uplink OFDMA transmissions are to have a predetermined length.

3. The method of claim 1, wherein:
a communication protocol, according to which the first communication device and the multiple second communication devices are configured to operate, specifies that all contention-based uplink OFDMA transmissions are to utilize one or more of i) a predetermined number of spatial streams, ii) a predetermined type of error correction coding, and iii) a predetermined modulation and coding scheme.

4. The method of claim 1, further comprising:
selecting, at the first communication device, the length of the OFDMA transmission from a set of multiple predetermined lengths corresponding to contention-based uplink OFDMA transmissions, wherein the set of multiple predetermined lengths is smaller than a set of possible lengths of uplink OFDMA transmissions that are not contention-based; and
including, at the first communication device, an indication of the selected length in a field of the trigger frame.

5. The method of claim 4, wherein:
the set of multiple predetermined lengths corresponds to a set of multiple types of contention-based uplink OFDMA transmissions;
selecting the length of the contention-based uplink OFDMA transmission from the set of multiple predetermined lengths comprises selecting, at the first communication device, a type of contention-based uplink OFDMA transmission from the set of multiple types of contention-based uplink OFDMA transmissions; and
including the indication of the selected length in the field of the trigger frame comprises including, at the first communication device, an indication of the selected type of contention-based uplink OFDMA transmission in a field of the trigger frame that is reserved for indicating a type of contention-based uplink OFDMA transmission that the trigger frame is configured to prompt.

6. The method of claim 1, wherein:
receiving the uplink OFDMA transmission includes receiving a sequence of values included in the uplink OFDMA transmission; and
the method includes processing, at the first communication device, the sequence of values to determine which second communication device transmitted the sequence of values.

7. The method of claim 6, wherein:
processing the sequence of values comprises correlating, at the first communication device, the sequence of values included in the uplink OFDMA transmission with another sequence corresponding to a particular second communication device.

8. The method of claim 7, wherein:
the other sequence also corresponds to a particular message from a set of multiple messages; and
the method further comprises determining whether the particular second communication device conveyed the particular message based on a result of correlating the sequence of values included in the contention-based uplink OFDMA transmission with the other sequence.

9. An apparatus, comprising:
a network interface device associated with a first communication device, the network interface device having one or more integrated circuits configured to:
generate a trigger frame to trigger an uplink orthogonal frequency multiple access (OFDMA) transmission, wherein the trigger frame is configured to indicate that multiple second communication devices can contend for a contiguous band of OFDM tones as part of the uplink OFDMA transmission,
wherein the trigger frame includes power control information that includes i) a transmission power value that indicates a transmission power used by the first communication device to transmit the trigger frame and ii) a target received power value that indicates a target received power, at the first communication device, for the uplink OFDMA transmission, and
wherein the power control information, including i) the transmission power value, and ii) the target received power value, is for use by communication devices participating in the uplink OFDMA transmission to determine respective transmission power levels for the uplink OFDMA transmission;
transmit the trigger frame; and
receive the uplink OFDMA transmission.

10. The apparatus of claim 9, wherein:
a communication protocol, according to which the first communication device and the multiple second communication devices are configured to operate, specifies that all contention-based uplink OFDMA transmissions are to have a predetermined length.

11. The apparatus of claim 9, wherein:
a communication protocol, according to which the first communication device and the multiple second communication devices are configured to operate, specifies that all contention-based uplink OFDMA transmissions are to utilize one or more of i) a predetermined number of spatial streams, ii) a predetermined type of error correction coding, and iii) a predetermined modulation and coding scheme.

12. The apparatus of claim 9, wherein the one or more integrated circuits are further configured to:
select a length of the uplink OFDMA transmission from a set of multiple predetermined lengths corresponding to contention-based uplink OFDMA transmissions, wherein the set of multiple predetermined lengths is smaller than a set of possible lengths of uplink OFDMA transmissions that are not contention based; and
include an indication of the selected length in a field of the trigger frame.

13. The apparatus of claim 12, wherein:
the set of multiple predetermined lengths corresponds to a set of multiple types of contention-based uplink OFDMA transmissions; and
the one or more integrated circuits are further configured to:
select a type of contention-based uplink OFDMA transmission from the set of multiple types of contention-based uplink OFDMA transmissions, and
include an indication of the selected type of contention-based uplink OFDMA transmission in a field of the trigger frame that is reserved for indicating a type of contention-based uplink OFDMA transmission that the trigger frame is configured to prompt.

14. The apparatus of claim 9, wherein the one or more integrated circuits are further configured to:
receive a sequence of values included in the uplink OFDMA transmission; and
process the sequence of values to determine which second communication device transmitted the sequence of values.

15. The apparatus of claim 14, wherein the one or more integrated circuits are further configured to:
correlate the sequence of values included in the uplink OFDMA transmission with another sequence corresponding to a particular second communication device; and
determine whether the particular second communication device transmitted the sequence of values based on a result of correlating the sequence of values included in the uplink OFDMA transmission with the other sequence.

16. The apparatus of claim 15, wherein:

the other sequence also corresponds to a particular message from a set of multiple messages; and the one or more integrated circuits are further configured to determine whether the particular second communication device conveyed the particular message based on the result of correlating the sequence of values included in the uplink OFDMA transmission with the other sequence.

* * * * *